United States Patent [19]

Kusaka et al.

[11] Patent Number: 5,410,383
[45] Date of Patent: Apr. 25, 1995

[54] FOCUS DETECTING DEVICE

[75] Inventors: Yosuke Kusaka; Ken Utagawa, both of Yokohama; Shigeyuki Uchiyama, Tokyo; Chiyuki Kuwata; Shozo Yamano, both of Tokyo, all of Japan

[73] Assignee: Nikon Corporation, Tokyo, Japan

[21] Appl. No.: 174,618

[22] Filed: Dec. 28, 1993

Related U.S. Application Data

[60] Continuation of Ser. No. 102,228, Aug. 5, 1993, abandoned, which is a division of Ser. No. 963,519, Oct. 20, 1992, Pat. No. 5,258,801, which is a continuation of Ser. No. 457,408, Dec. 26, 1989, abandoned.

[30] Foreign Application Priority Data

Dec. 29, 1988 [JP] Japan .................. 63-331748

[51] Int. Cl.6 ........................... G03B 13/36
[52] U.S. Cl. ........................... 354/402; 354/409
[58] Field of Search ........... 354/402, 403, 406, 407, 354/408, 409

[56] References Cited

U.S. PATENT DOCUMENTS

| | | | |
|---|---|---|---|
| 4,470,681 | 9/1984 | Johnson | 354/403 |
| 4,827,303 | 5/1989 | Tsuboi | 354/403 |
| 4,943,824 | 7/1990 | Nabeshima et al. | 354/403 X |
| 5,191,201 | 3/1993 | Kusaka et al. | 354/408 X |

Primary Examiner—W. B. Perkey
Attorney, Agent, or Firm—Shapiro and Shapiro

[57] ABSTRACT

A focus detecting device comprises an image forming optical system, a device for detecting the defocus amount with respect to a predetermined plane of a plurality of images, formed by the image forming optical system, of fields corresponding to a plurality of detection areas which are set beforehand, a device for classifying the plurality of detection areas into a plurality of groups on the basis of the defocus amount, a device for selecting one optimum group from the plurality of groups, and a device for determining one final defocus amount on the basis of the defocus amount corresponding to detection areas belonging to the optimum group.

18 Claims, 15 Drawing Sheets

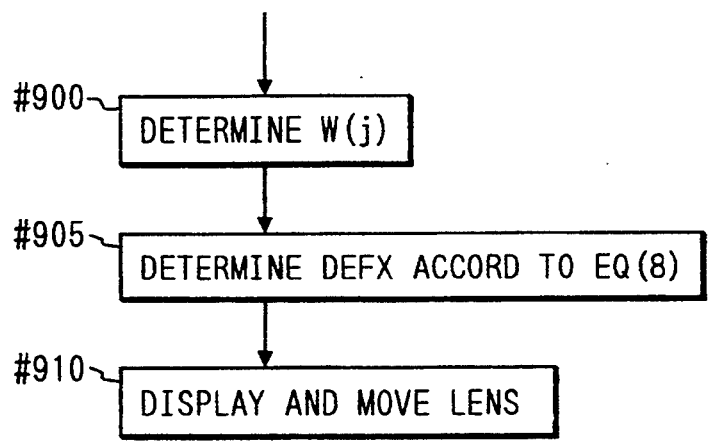
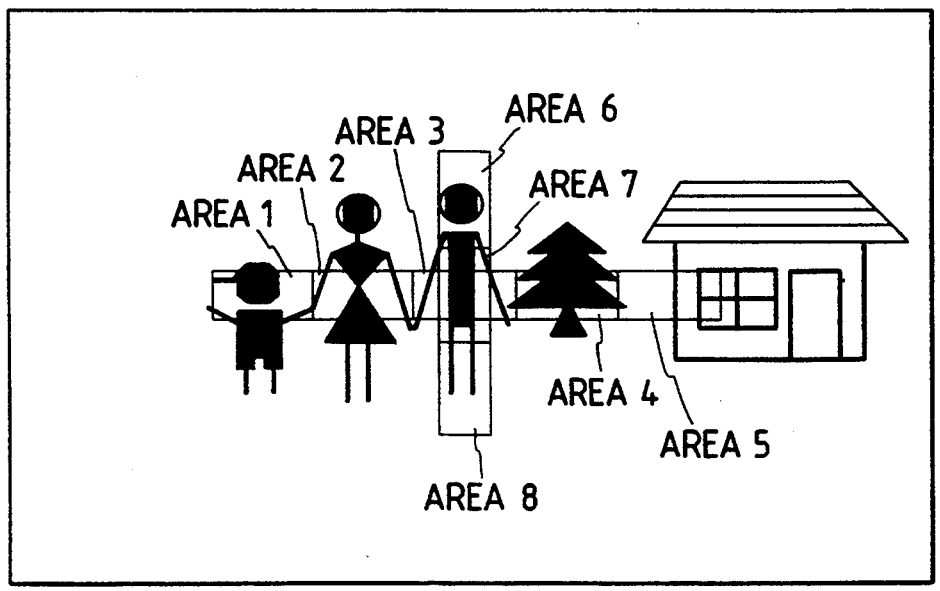

FOCUS DETECTING DEVICE

This is a continuation of application Ser. No. 102,228 filed Aug. 5, 1993 (abandoned), which is a division of application Ser. No. 963,519 filed Oct. 20, 1992 (U.S. Pat. No. 5,258,801), which is a continuation of application Ser. No. 457,408 filed Dec. 26, 1989 (abandoned).

BACKGROUND OF THE INVENTION

1. Field of the Invention

This invention relates to a focus detecting device for cameras or the like.

2. Description of the Related Art

There is a known focus detecting device which sets a plurality of focus detection areas in a photograph image plane, detects the focus in each of the focus areas, and determines finally one defocus amount on the basis of this plurality of defocus amounts. As examples of determining one defocus amount, there are the following methods.

1. Closest focusing priority method: a method by which the amount of defocus at the closest side among the defocus amounts is chosen.
2. Contrast priority method: a method by which the amount of the defocus in a focus detection area which has the highest contrast and reliability among a plurality of focus detection areas is selected.
3. Statistical average method: a method by which the final amount of defocus according to the statistical average of a plurality of defocus amounts is determined.

Such focus detecting devices of the prior art have the following problems.

① Problems of the closest priority method

Focusing on a closest object may not be consistent with the photographer's intention. For example, when a photographer takes aim at an animal inside a wire cage as an object, the wire cage is focused on, which does not satisfy his intentions. When the contrast of a focus detection area which is selected as the closest is low and the defocus amount varies each time a focus point is detected, the final amount of the defocus is not stable since it varies in response to the defocus amount.

② Problems of the contrast priority method

The contrasts of two focus detection areas may be substantially the same maxium but the defocus amounts may differ greatly. When the focus detection area of the maximum contrast alternates each time a focus is detected, shifting occurs between two defocus amounts and stability is poor. If there is even one focus detection area with a high contrast, an object of a focus detection area with a high contrast is focused on regardless of the photographer's intentions. For example, when the face of a human with a low contrast is viewed against a background with a high contrast, the background is focused and the intentions of the photographer are not satisfied. Further, in a focus detection area with the highest contrast, when the contrast is not very high, the defocus amounts vary each time a focus is detected, and there is no stability since the final amount of the defocus varies.

③ Problems of the statistical average method

Averaging defocus amounts for a plurality of areas may result in focusing that is inappropriate. For example, when a human in the foreground is viewed against a distant background, neither the far view nor the human is focused.

To sum up the drawbacks of the prior art as described above, when one area is selected from a plurality of divided focus detection areas and the amount of the defocus of the area is adopted as a final amount of defocus, there is a certain probability that an object which a photographer views is focused, but this probability is not sufficient. Also, since the variations in the amount of the defocus are reflected in variations of the final defocus amount, the stability is poor.

When the average amount of the defocus of a plurality of divided focus detection areas is adopted as the final defocus amount, variation in the final amount of the defocus may be small and the stability may be improved. However, the probability that the object at which the photographer takes aim will be in focus is small.

SUMMARY OF THE INVENTION

An object of the present invention is to provide a focus detecting device in which stability is high and in which the probability that an object at which the photographer takes aim at is focused is increased.

A focus detecting device of the present invention measures the amount of defocus of a current image plane with respect to the predetermined plane of each of a plurality of focus detection areas which are set in a field, groups the plurality of focus detection areas into a plurality of groups according to the amount of defocus of each area, selects from a plurality of groups the one containing the object judged to be of interest, and determines the amount of defocus on the basis of the amount of the defocus of a focus detection area belonging to the most appropriate group.

A portion of an object image formed by a photo-taking optical system such as a camera or the like is directed to a focus detector comprising a known focus detection optical system, an image sensor, a microprocessor and the like. The focus detector finds the amount of the defocus of a plurality of focus detection areas by performing a known focus detection arithmetic operation on data of an image sensor corresponding to a plurality of focus detection areas which are set in a photograph image plane, as shown in FIG. 5.

A grouping means groups a plurality of focus detection areas into some groups for which the same object seems to have been captured on the basis of the amount of the defocus.

An optimum group selecting means selects an optimum group to which the object which is most probably the object of the photographer's interest belongs from among the plurality of groups.

An optimum defocus amount calculating means calculates the optimum amount of the defocus for the entire system on the basis of an amount of the defocus belonging to the optimum group.

As a result of this, the amount of the defocus varies little and stability is obtained.

Even in the case where a plurality of objects exist in a focus detection area in an image plane, they can be identified accurately by grouping in this way. The accurate identification of objects enables the selection results by the optimum group selection process to be matched with the intention of a photographer. The optimum defocus amount is determined by using a defocus amount found in a group which is coherent to a certain degree. So, variations are decreased and the results are not wide apart from each result in the group.

BRIEF DESCRIPTION OF THE DRAWINGS

FIGS. 7 to 16 are views for explaining a grouping process;

FIGS. 7, 11, 13 and 15 are flowcharts illustrating processes of a first, second, third and fourth embodiment respectively;

FIGS. 8, 9A, 9B, 10A, 10B, 12, 14, and 16 are explanatory views;

FIG. 19 is a flowchart of a calculation process of an optimum defocus amount; and FIG. 20 is a view illustrating the finder image plane of a camera.

DETAILED DESCRIPTION OF THE PREFERRED EMBODIMENTS

Figure 1:
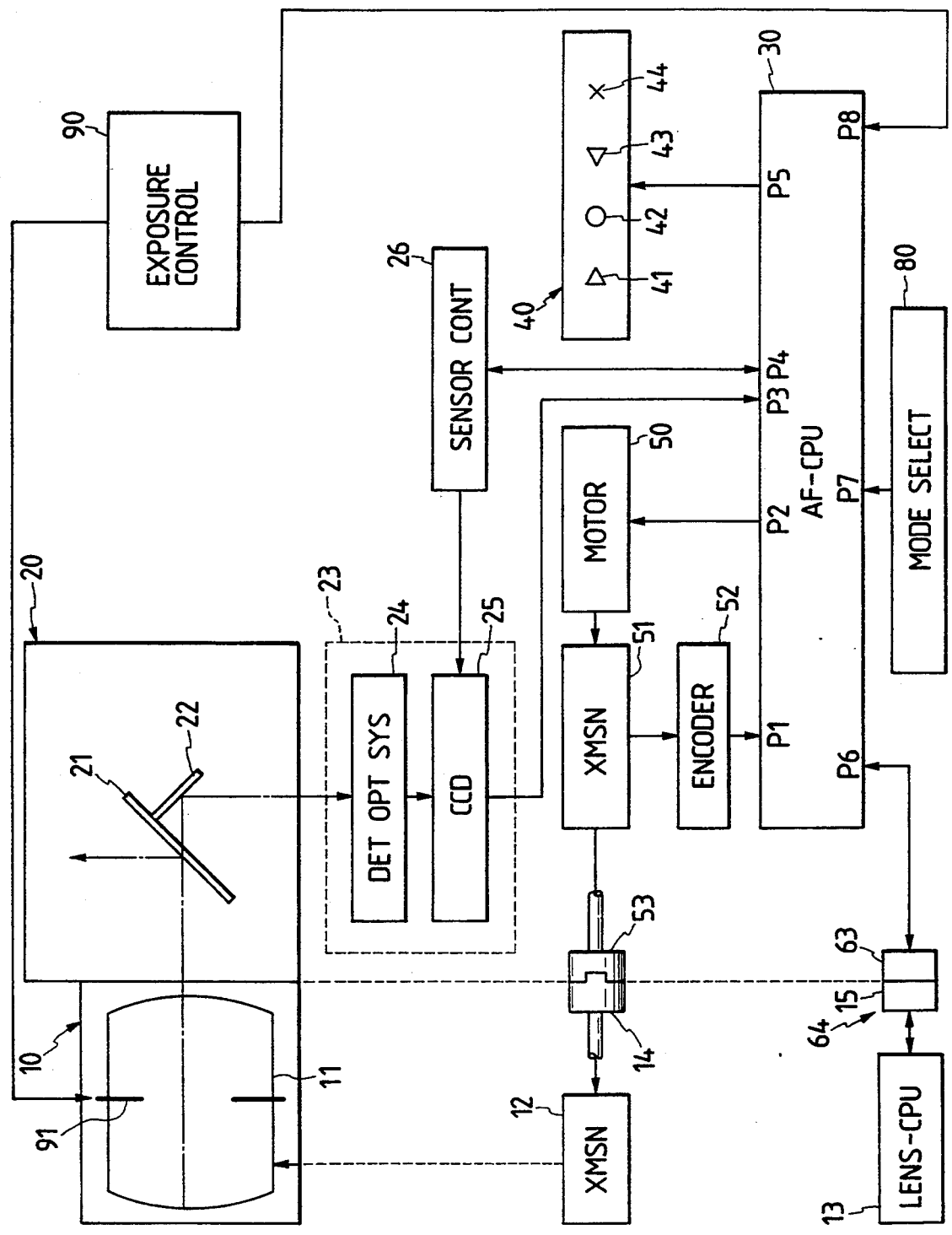
FIG. 1 is a configurational view of a focus detecting device of a camera in accordance with the embodiments of the present invention.

Referring to FIG. 1, a configuration is explained in which a focus detecting device of the present invention is applied to an interchangeable single-lens reflex camera system.

An interchangeable lens assembly 10 is detachably mounted on a camera body 20. In the state when the lens assembly 10 is mounted, the photograph light flux arriving from an object passes through a lens system 11. Some of the light flux is reflected by a main mirror 21 provided on the camera body 20 and directed to a finder. Some of the other light flux penetrates the main mirror 21, is reflected by a submirror 22 and is directed to an AF module 23 as a light flux for focus detection.

Figure 2:
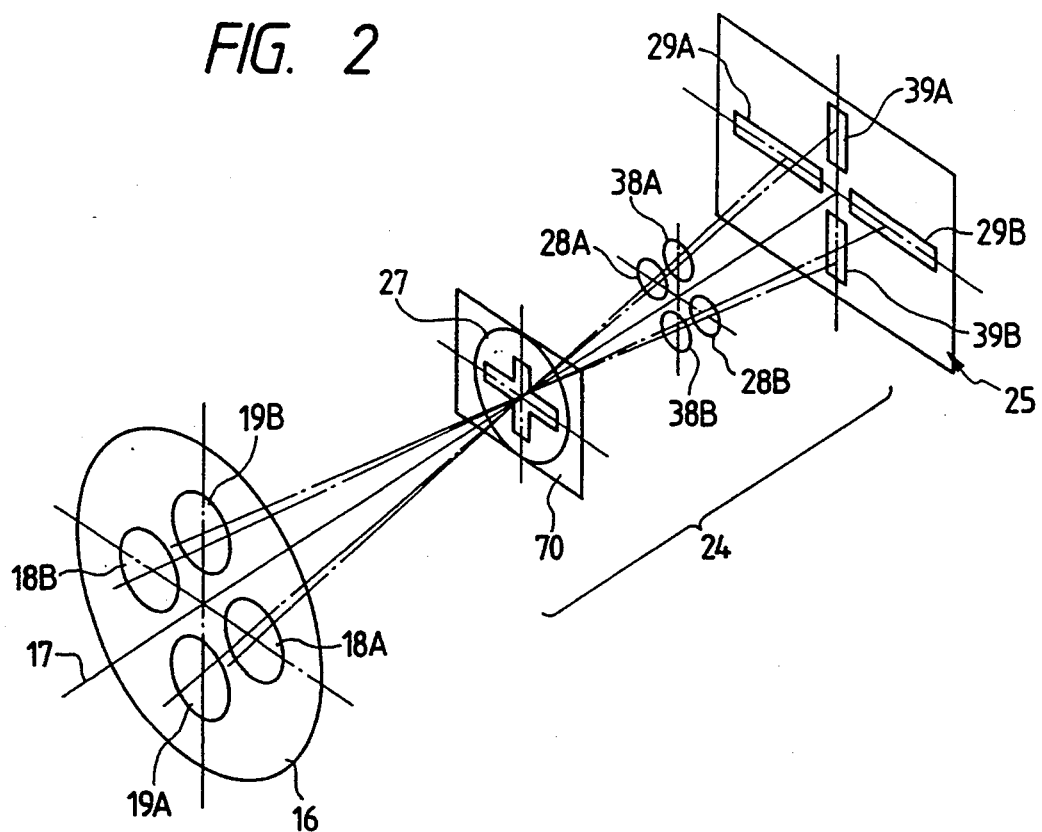
FIG. 2 is an explanatory view of a focus detection optical system.

As shown in FIG. 2, the AF module comprises a detection optical system 24 including a field box 70, a field lens 27, and two pairs of image reforming lenses 28A and 28B, 38A and 38B, and comprises a photoelectric converter 25 such as a CCD or the like consisting of two pairs of light receiving sections 29A and 29B, 39A and 39B. In the above configuration, a light flux passing through each of two pairs of areas 18A and 18B, 19A and 19B included in an exit pupil 16 of the camera lens 11 and symmetric with respect to an optical axis 17 forms a primary image near the vision field box 70 having an opening shape corresponding to the entire focus detection area. Some of the primary image formed on the opening of the vision field box 70 is furthermore formed on the two pairs of light-receiving sections 29A and 29B, 39A and 39B by the field lens 27 and the two pairs of image reforming lens 28A and 28B, 38A and 38B, as two pairs of secondary images.

As is well known, by detecting the relative positional relation of the secondary images of each pair on the corresponding sections of photoelectric converter 25 the defocus amount of the photography lens 11 can be detected. Also, by detecting this positional relation for each of a plurality of focus detection areas which are set in a photograph image plane, the defocus amount can be detected for each of the focus detection areas.

Figure 3:
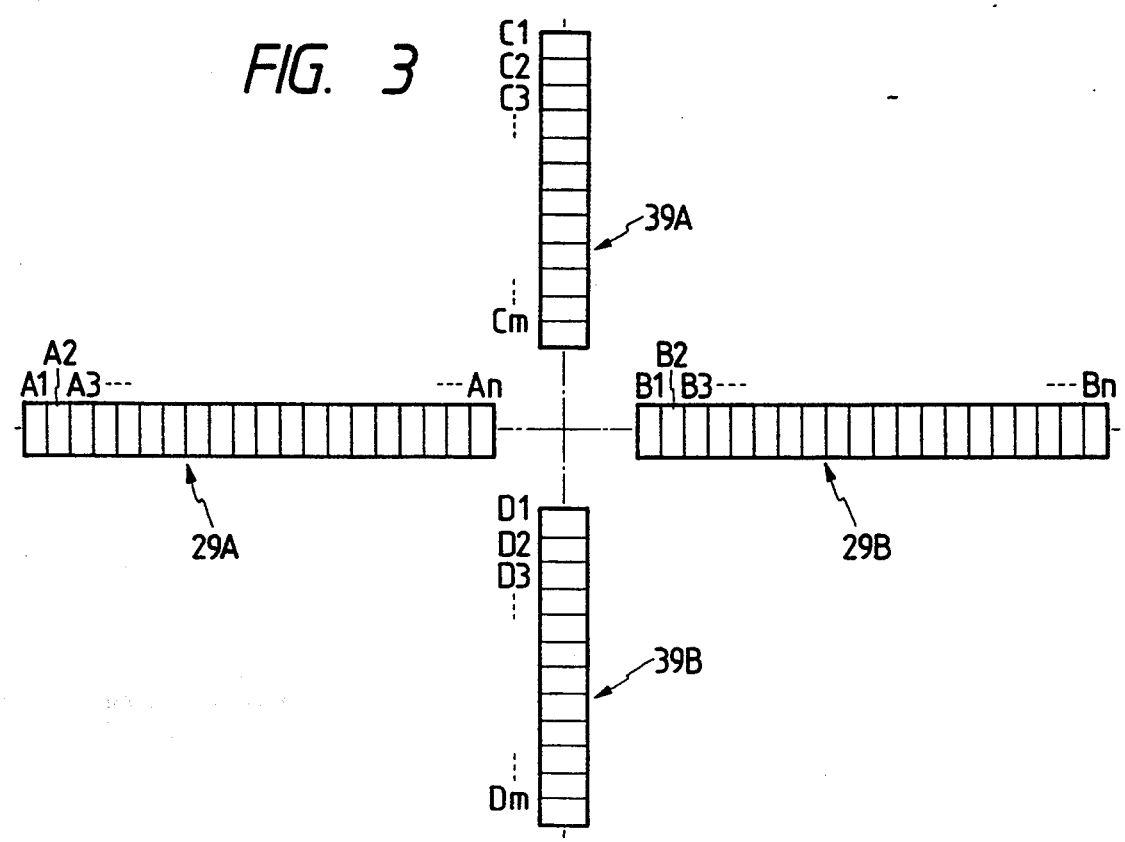
FIG. 3 is a configurational view of a photoelectric conversion device.

The configuration of the arrangement of the light-receiving sections on the photoelectric converter 25 is shown in FIG. 3.

The light-receiving sections 29A, 29B respectively consist of n pieces of light-receiving elements Ap, Bp (p=1 to n) and are positioned so that when a primary image coincides with a film plane, outputs of each corresponding pair of light-receiving elements (A1 and B1, A2 and B2, ... ) become equal.

The light-receiving sections 39A, 39B respectively consist of m pieces of light-receiving elements Cq, Bq (q=1 to m) and are positioned so that when a primary image coincides with a film plane, outputs of each corresponding pair of light-receiving elements (C1 and D1, C2 and D2, ... ) become equal.

The light-receiving elements constituting light-receiving sections 29A, 29B, 39A and 39B are made up of charge storage type elements such as photodiodes. The operation of storing charges during charge storage time and corresponding to the illuminance on the photoelectric converter 25 enables a light-receiving element to be controlled to the output level appropriate for a focus detection calculation to be described later.

Figure 4:
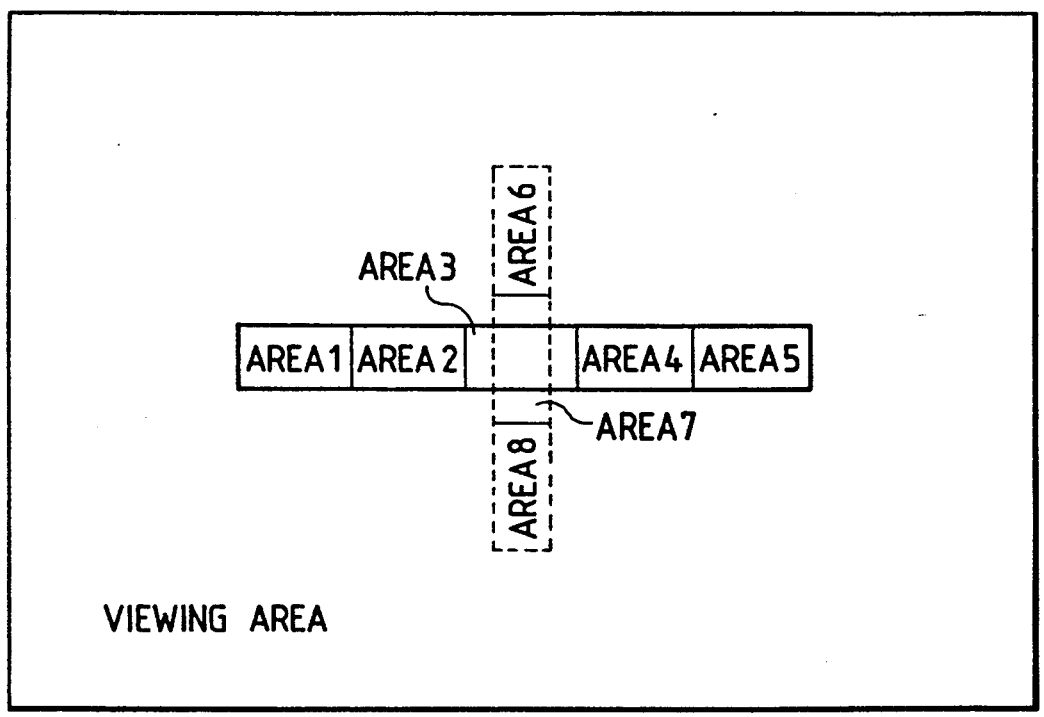
FIG. 4 is an explanatory view of a focus detection area; 10

By arranging a detection optical system as described above, a plurality of focus detection areas AREAS 1 to 8 as shown in FIG. 4 are set on a photograph image plane.

Referring back to FIG. 1, the explanation will be continued.

A sensor control section 26 receives a charge storage start and termination instruction from the port P4 of an AF-CPU 30 (CPU for AF) and controls the charge storage time of the photoelectric converter 25 by providing a control signal corresponding to the instruction to the photoelectric converter 25. The sensor control section 26 supplies a transfer clock signal or the like to the photoelectric converter 25 and transfers a light-receiving element output signal to the AF-CPU 30 chronologically, as well as sending a synchronization signal in synchronization with the transfer start of a light-receiving element output signal to the port P4 of the AF-CPU 30. The AF-CPU 30 starts A/D conversion of output signals from a light-receiving element which is input to the port P3 from an A/D converter synchronously and obtains A/D conversion data corresponding to the number of light-receiving elements. At the completion of the A/D conversion, data processing is performed on the obtained data to determine the optimum defocus amount.

The operations of the present invention i.e., focus detection, grouping, optimum group selection and optimum defocus amount calculation, are achieved by the programs of the AF-CPU 30.

The AF-CPU 30 controls the display configuration of the display sections 41, 42, 43 and 44 of a display device 40 by using the port P5 on the basis of the optimum defocus amount.

The AF-CPU 30 also moves the lens system 11 to the best-focus position by controlling the driving direction and the driving amount of a motor 50 on the basis of the optimum defocus amount as in the following.

First, the AF-CPU 30 generates a signal to cause the motor 50 to rotate in the direction in which the lens system 11 approaches the best-focus position, from the port P2 according to the code of the defocus amount (front pin, back pin). The rotational motion of the motor 50 is transmitted to the lens system 11 via a coupling 53 at the body side a coupling 14 at the lens side, and a transmission system 12 made up of gears or the like which are incorporated in the lens assembly 10, and causes the lens system 11 to move in the direction of the best-focus position.

The driving amount of the motor 50 causes the rotational amount of gears or the like constituting a transmission system 51 to be converted into a pulse train signal by an encoder 52 made up of a photointerrupter or the like. The pulse train signal is fed back to the port P1 and the AF-CPU 30 detects the driving amount of the motor 50 and controls it by counting the number of pulses.

The lens assembly 10 has a lens CPU 13 built in, which is connected to the AF-CPU 30 by means of a port P6 via a communication bus 64 of a lens-side contact point 15 provided on the mount side and a body-side contact point 63, and AF related information of the lens assembly 10 is sent to the AF-CPU 30.

A mode selection device 80 sends the information of focus detection modes (center weighted, closest priority, reliability priority, focus driving time priority and the like) selected automatically or manually to the port P7, and the AF-CPU 30 switches the methods of focus detection processes on the basis of the information.

An exposure control device 90 measures the brightness of a field, and drives and controls the aperture 91 of a photograph lens so as to obtain a proper exposure. F value information of a lens is input to the port P8 of the AF-CPU.

The above description is the summary of the configuration and operations of the embodiments of the invention.

The details of focus detection, grouping, optimum group selection and the calculation of the optimum defocus amount with respect to a plurality of areas which are performed inside the AF-CPU 30 will now be explained.

Focus Detection Process

First, the focus detection process will be explained with reference to FIGS. 5 and 6.

The light-receiving element output data corresponding to light-receiving elements Ap, Bp (p=1 to n) and Cq, Dq (q=1 to m) which are obtained by A/D conversion are expressed as ap, bp (p=1 to n) and cq, dq (q=1 to m). For simplicity, the explanation is only on the light-receiving element output data ap, bp. The same applies to the light-receiving element output data cq, dq. A correlation amount C (j, L) of light-receiving element output data cq, dq is determined for each of the detection areas by a correlation calculation shown in equation (1).

$$C(j, L) = \sum_r |a(r + L) - b(r)| \quad (1)$$

Where, L is an integer and indicates a relative shift amount (deviation amount) in units of pitches of the light-receiving elements of a pair of light-receiving element output data; j indicates a focus detection area. In the integrating calculation of equation (1), the range of the parameter r is properly determined according to the shift amount L and the detection area j.

Figure 5:
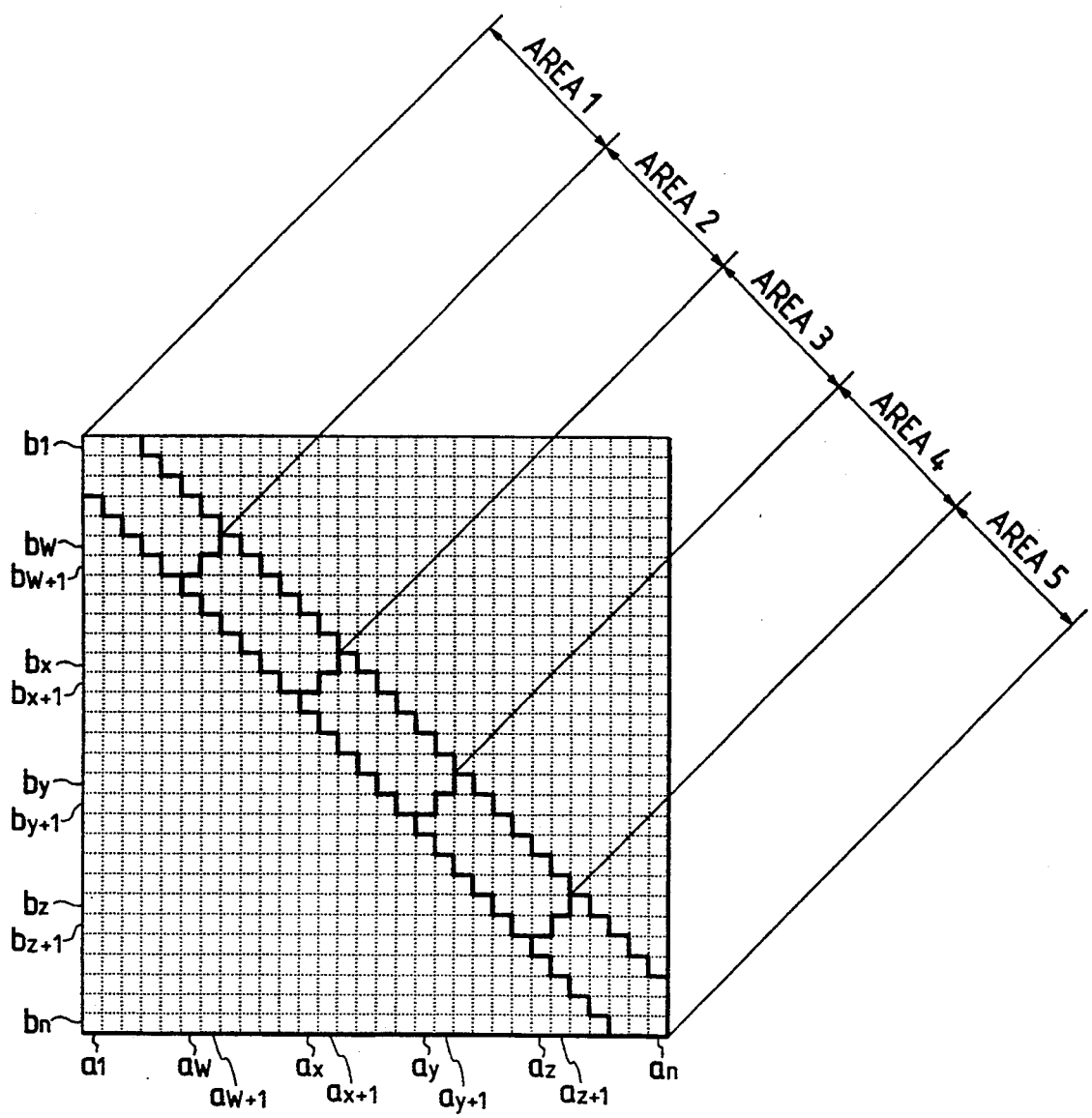
FIGS. 5 and 6 are an explanatory view and a flowchart of a focus detection process respectively.

When the light-receiving output data ap, bp are made to correspond to a matrix, for example, as shown in FIG. 5, the combination of light-receiving output data in equation (1), namely the range of the parameter r can be determined. In FIG. 5, a shift amount L is made to vary in the range of −2 to +2 and the area surrounded by a thick line indicates the position on the matrix of a combination of light-receiving element output data on which correlation arithmetic operation is performed.

When the shift amount L is 0, for example, the range of the parameter r of equation (1) is as follows for each detection area j.

When j=1, r=1 to w
When j=2, r=w+1 to x
When j=3, r=x+1 to y
When j=4, r=y+1 to z
When j=5, r=z+1 to n ... (2)

The shift amount xm (j) which has the highest correlation of light-receiving element output data in each detection area can be determined by applying the method disclosed in U.S. Pat. No. 4,561,749 to the result of equation (1).

$$xm(j) = x + \frac{D(j)}{SLOP(j)} \quad (3)$$

However, if it is assumed that the minimum value of the correlation amount C (j, L) determined discretely is found in the shift amount L=x, D and SLOP in equation (3) can be determined by the following equations.

$$D(j) = \frac{C(j, x - 1) - C(j, x + 1)}{2} \quad (4)$$

$$SLOP(j) = MAX(C(j, x + 1) - C(j, x), C(j, x - 1) - C(j, x)) \quad (5)$$

The defocus amount DEF (j) for each detection area can be determined by the following equation from the shift amount xm (j) found in equation (3).

$$DEF(j) = KX(j) \times PY(j) \times xm(j) + CZ(j) \quad (6)$$

In equation (6), PY (j) is a pitch in the direction in which light-receiving elements are positioned for each detection area. A value corresponding to an area (in the case where sensor pitches in the vertical and horizontal directions differ) is stored in the AF-CPU 30. KX (j) is a coefficient which is determined for each detection area by the arrangement of the detection optical system of FIG. 2. A value corresponding to the area is stored in the AF-CPU 30. CZ (j) is an offset value for each area, consisting of an aberration amount of a photograph optical system (read from the lens CPU 13) and a correction value (stored in EEPROM (electrically erasable and programmable ROM) for each body) determined by the position adjustment state of the AF module 23 with respect to the body 20.

The parameter SLOP (j) determined in equation (5) is an amount substantially proportional to the contrast of an object image. The greater its value, the deeper the offset in the vicinity of the minimum value of the correlation amount C (j, L) indicating that its correlation is large. Therefore, the reliability of the defocus amount DEF (j) obtained is high.

In cases where the minimum value xm (j) cannot be found and the defocus amount DEF (j) can not be defined, or the defocus amount DEF (j) is determined but SLOP (j) is small and the reliability is low, it is judged that focus detection cannot be made and DEF (j)= ∞ is set.

Figure 6:
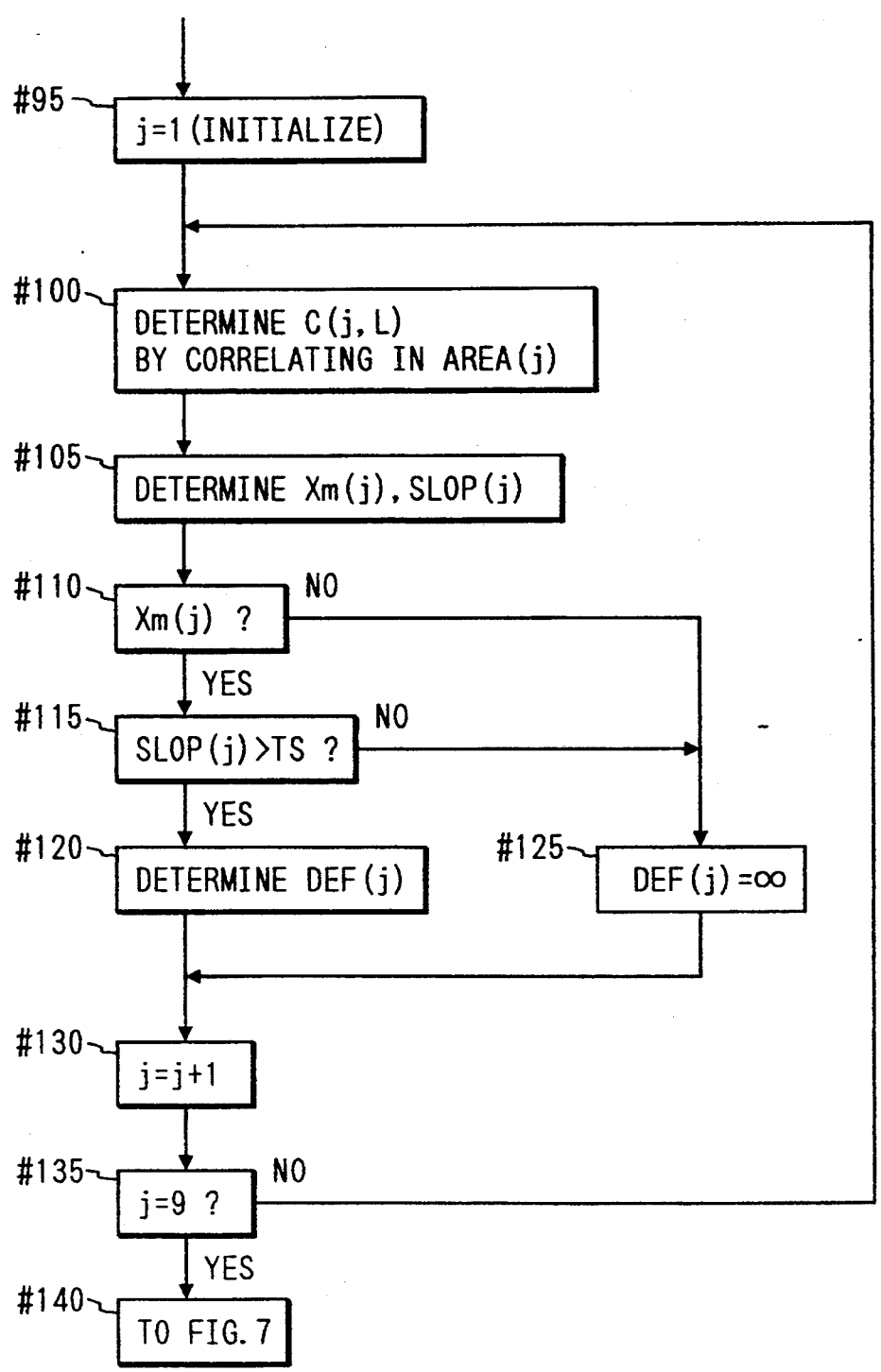

FIG. 6 is a flowchart illustrating the operation of the above-mentioned focus detection process.

First, in step #95, j is set at 1 to initialize a focus detection area. In step #100, a correlation operation is performed by the focus detection area AREA (j) to find the correlation amount C (j, L). In step #105, xm (j) and SLOP (j) are determined according to equations (3) and (5). In step #110, it is judged whether xm (j) is determined. When xm (j) is not determined, the operation proceeds to step #125; when it is determined, it is then judged whether SLOP (j) is above a predetermined value TS in step #115. When it is below TS, i.e., it is judged that there is no reliability, and the operation proceeds to step #125. When SLOP (j) is judged greater than TS in step #115, the operation proceeds to step #120 where the defocus amount DEF (j) is determined and the operation then proceeds to step #130. On the other hand, when the operation proceeds to step #125, it is judged that focus detection cannot be made and DEF (j)=∞ is set and the operation proceeds to step #130. In step #130, j=j+1 is set and the focus detection area is updated to the next area. In step #135, it is judged whether j=9. In the case of j≠9, the operation returns to step #100 where a correlation operation is performed by the next detection area. In the case of j=9 in step #135, since focus detection for all the areas is finished, the operation skips a focus detection process and proceeds to the grouping process of step #140.

As described above, defocus amounts can be determined in all the detection areas. In the above-mentioned explanation, a cross-shaped detection area shown in FIG. 4 is divided into eight portions and the defocus amount of each area is detected. However, the shape and the number of divisions of a detection area are not limited to this. No problem arises if detection areas are overlapped or the boundaries of the areas are changed according to the distribution of the intensity of an object image.

Grouping Process

The grouping process groups a plurality of detection areas into a group which is highly probably to have captured the same object according to a plurality of defocus amounts determined by a focus detection process.

Figure 7:
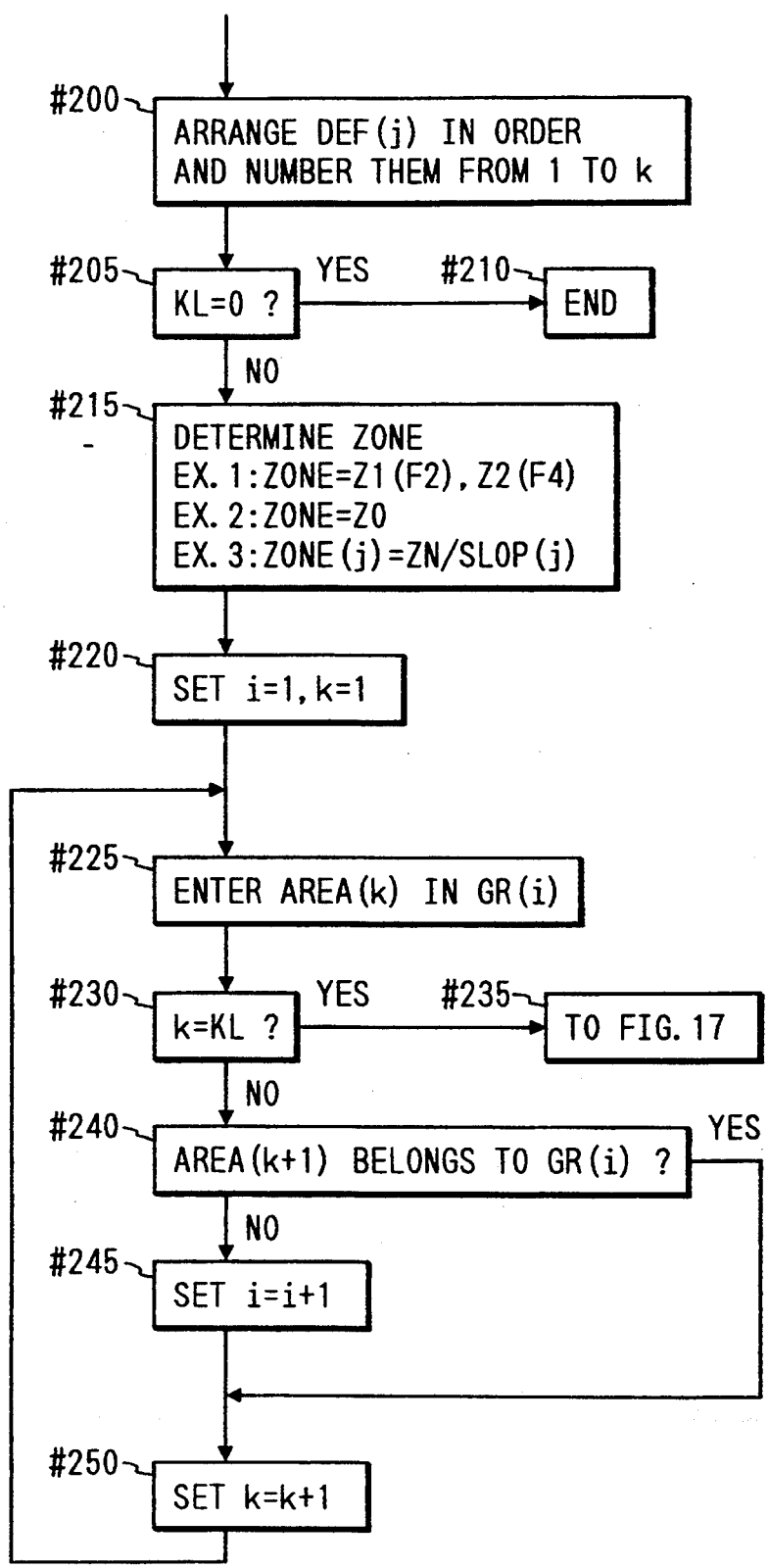

FIG. 7 is a flowchart showing a first embodiment of the grouping process.

Figure 8:
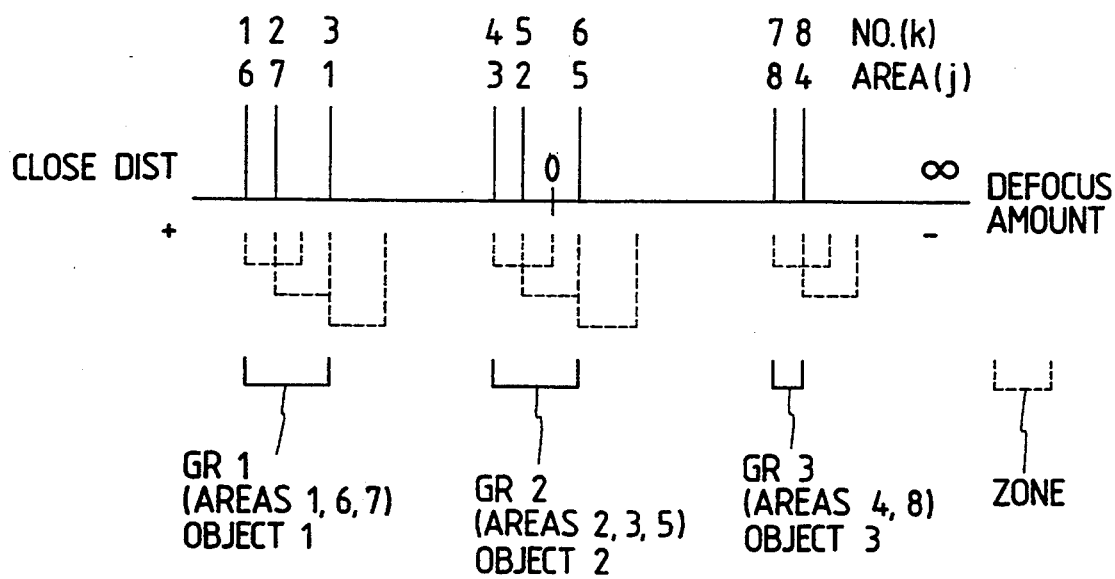

First, in step #200, as shown in FIG. 8, detection areas are sorted in the ascending order of the defocus amount of the area (in the order of near closest) and number k is numbered beginning in sequence with 1. However, areas in which detection cannot be made (defocus amount DEF (j)=∞) are not numbered, and when detection cannot be made in all the areas, the number k is set to 0. The last number is set to KL. Accordingly, the case of KL=0 indicates that detection cannot be made in all the areas.

In step #205, it is judged whether KL=0, that is, whether detection cannot be made in all the areas. When detection cannot be made, the operation proceeds to step #210. It is regarded that detection cannot be made in all the areas and subsequent processes are cancelled, and therefore, the next focus detection operation is started. When detection can be made, in step #215 the size of the zone on the defocus axis used in the grouping process, namely, the depth of the field which can be regarded as the same object, is determined as follows:

EXAMPLE 1

The depth of a field varies according to the F-number of a photograph optical system at the time of photo-taking. When the F-number is small, the depth is also greater and the size of the zone which can be regarded as the same object is spread, so the size of the zone is determined according to the photograph F-number.

EXAMPLE 2

The size of a zone is fixed to a predetermined value and an image plane regarded as the same object is made to enter within a fixed depth at all times.

EXAMPLE 3

The defocus amount determined in the above-mentioned detection process has a certain range of uncertainty. The range varies depending on the reliability of the defocus amount SLOP value or on the contrast of an object image in that area. For example, the range of uncertainty is generally inversely proportional to the reliability SLOP, therefore the size of a zone is determined in proportion to the inverse number of the SLOP value of the area. When the size of a zone is determined in this way, the possibility that an area having a highly reliable defocus amount will form a group separate from the other areas becomes high. The probability that the object image which the area captures is focused becomes high. For example, a predetermined zone width is denoted by ZN and the size of the zone of each area is ZONE (J)=ZN/SLOP (j). In this case, the upper and lower limit values of an area may be set. The contrast CON (j) is determined by calculating the sum of absolute values of the difference between neighboring light-receiving element output data within the area, and this sum may be used in place of the SLOP value.

In step #220, for initialization of a grouping process, the group number i and the number k of an area in the order of defocus are both set at 1. In step #225, the area of number k is entered to group GR (i). In step #230, it is judged whether the number k has become the last number KL. In the case of "yes", the grouping process is terminated and the operation proceeds to step #235 of an optimum group selection process in FIG. 17. In the case of "no", the grouping process is continued and the operation proceeds to step #240.

Figure 9A:
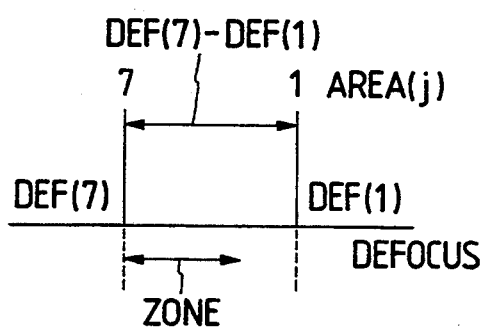
Figure 10A:
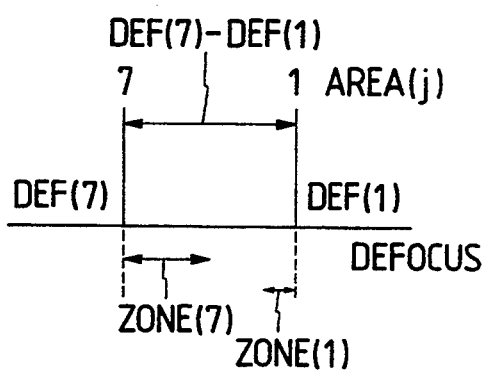
Figure 10B:
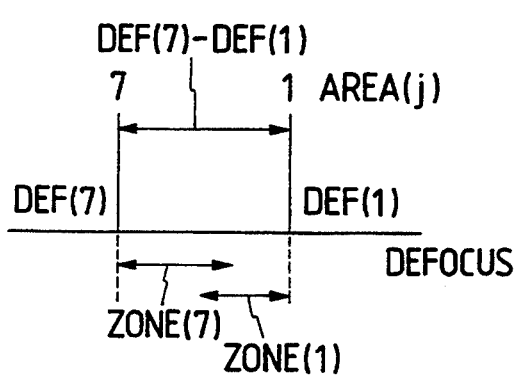

When the size of a zone is determined according to example 1 or 2 in step #215, it is judged in step #240 whether the defocus amount of the area of the number k+1 falls within the zone of the infinite side from the defocus amount of the area of number k. In the case of FIG. 9A, for example, the two areas 7 and 1 are judged to be within the zone and become the same group. When the zone size is determined as in example 3, it is judged whether the difference between the defocus amount of the area of number k and the defocus amount of the area of number k+1 is smaller than the sum of the zone size determined by the SLOP value of the area of number k+1. In the case of FIG. 10A, for example, the two groups 7 and 1 are judged out of the zone and become separate groups. In the case of FIG. 10B, the two groups 7 and 1 are judged to be within the zone and become the same group.

When it is judged that they are separate groups in step #240, group numbers are updated in step #245 and the operation proceeds to step #250. When it is judged that they are the same group, step #245 is skipped and the operation proceeds directly to step #250. In step

250, the number k is updated, after which the operation returns to step #225.

Figure 9B:
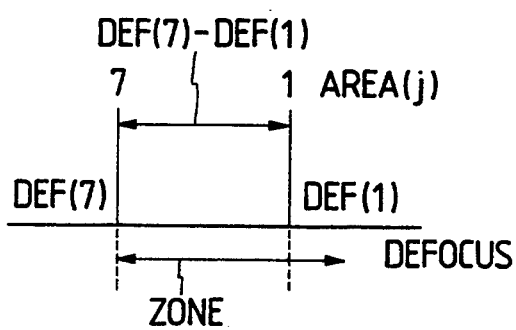

When the above process is repeated and the operation proceeds to step #235, grouping of areas has been done, for example, as in FIG. 8. In the case of the first embodiment of the grouping process, the spread of one group on the defocus axis is flexible. When a plurality of areas exist in a group, one area belonging to the group should be in such a relationship with at least another one area as in FIGS. 9B and 10B. In such grouping, since the great spread of groups can be achieved, the entire object can be captured as one group even when an object whose focus point position varies continuously in a wide area like a poster put up on a wall seen from a diagonal direction. Of course, a certain upper-limit may be provided on the spread of a group or when the sum of the SLOP value of the area added to a group reaches a certain value, the group may be updated.

Figure 11:
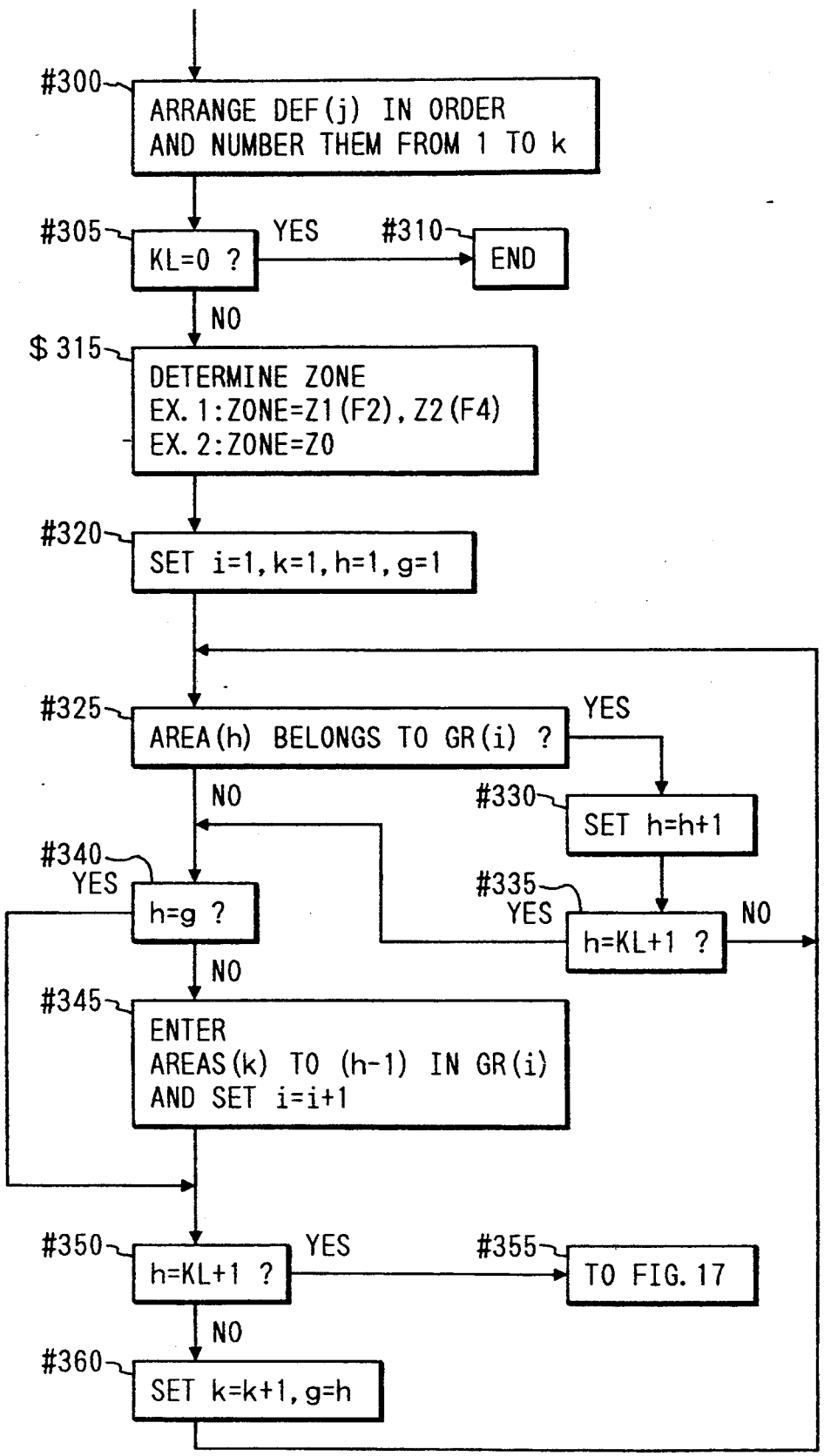

FIG. 11 is a flowchart of a second embodiment showing a grouping process.

The processes from step #300 to step #315 are the same as the processes from step #200 to step #215 of the first embodiment in FIG. 7, so the explanation is omitted. On the occasion of determining the zone size in step #315, however, the case of example 3 is excluded.

In step #320, for initialization of a grouping process, a group number is set at 1, and the top number k, the last number h and the end number g of an area in a defocus order are all set at 1. In step #325, it is judged whether the defocus amount of the area of number h falls within the zone of the infinite side from the defocus amount of the area of number k. When it is judged that they do not belong to the same group, zone judgment is terminated and the operation proceeds to step #340. When it is judged that they belong to the same group, the last number h is updated in step #330. In step #335, it is judged whether the last number h exceeds the end number. In the case of "no", the operation returns to step #325, where zone judgment is continued. In the case of "yes", the zone judgment is terminated and the operation proceeds to step #340.

In step #340, it is judged whether the last number h become g, namely, whether this group falls within the last group. In the case of "no", the area from the top number k to the last number h falls within the group i and the group number i is updated in step #345 and the operation proceeds to step #350. In the case of "yes", group registration in step #345 is not performed and the operation proceeds to step #350. In step #350, it is judged whether the last number h exceeds the end number KL. In the case of "yes", the grouping process is terminated and the operation proceeds to the optimum group selection process of step #355. In the case of "no", the top number k is updated in step #360 and the end number g is rewritten to the last number h and the operation returns to step #325 where the grouping process is continued.

Figure 12:
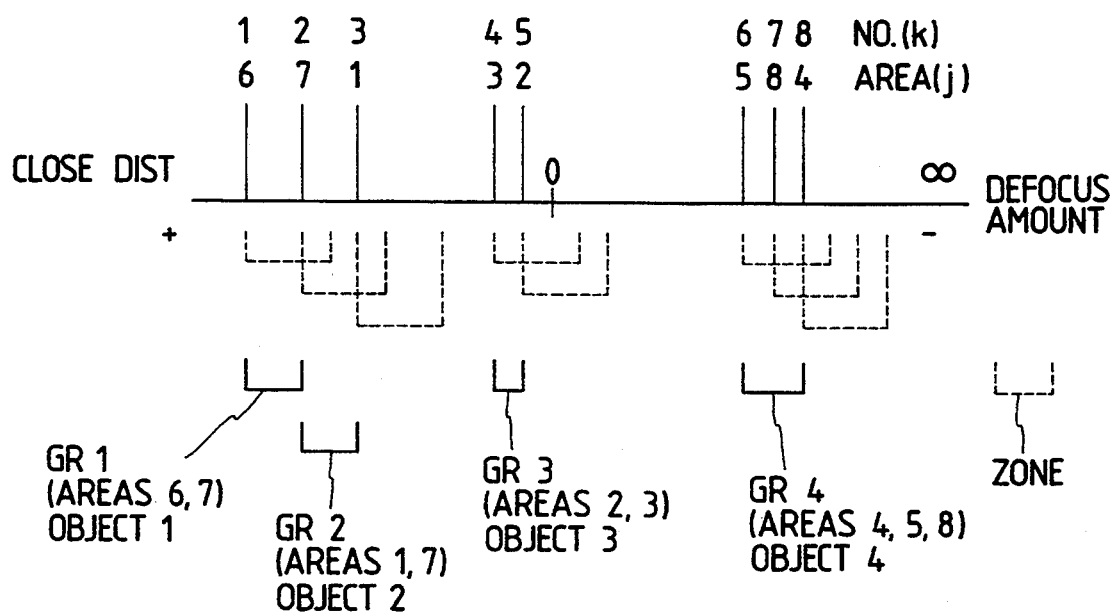

The above process is repeated and when the operation branches to step #355, a grouping process has been performed, for example, as in FIG. 12. In the case of the second embodiment of the grouping process, the spread of one group on the defocus axis is fixed. When a plurality of areas exist in a group, any two areas among the areas belonging to the group satisfy such a relationship as that in FIG. 9B. In such grouping, since the spread of groups can be relatively narrowly limited, the grouping of objects which is finer and more accurate than that of the first embodiment can be achieved.

Figure 13:
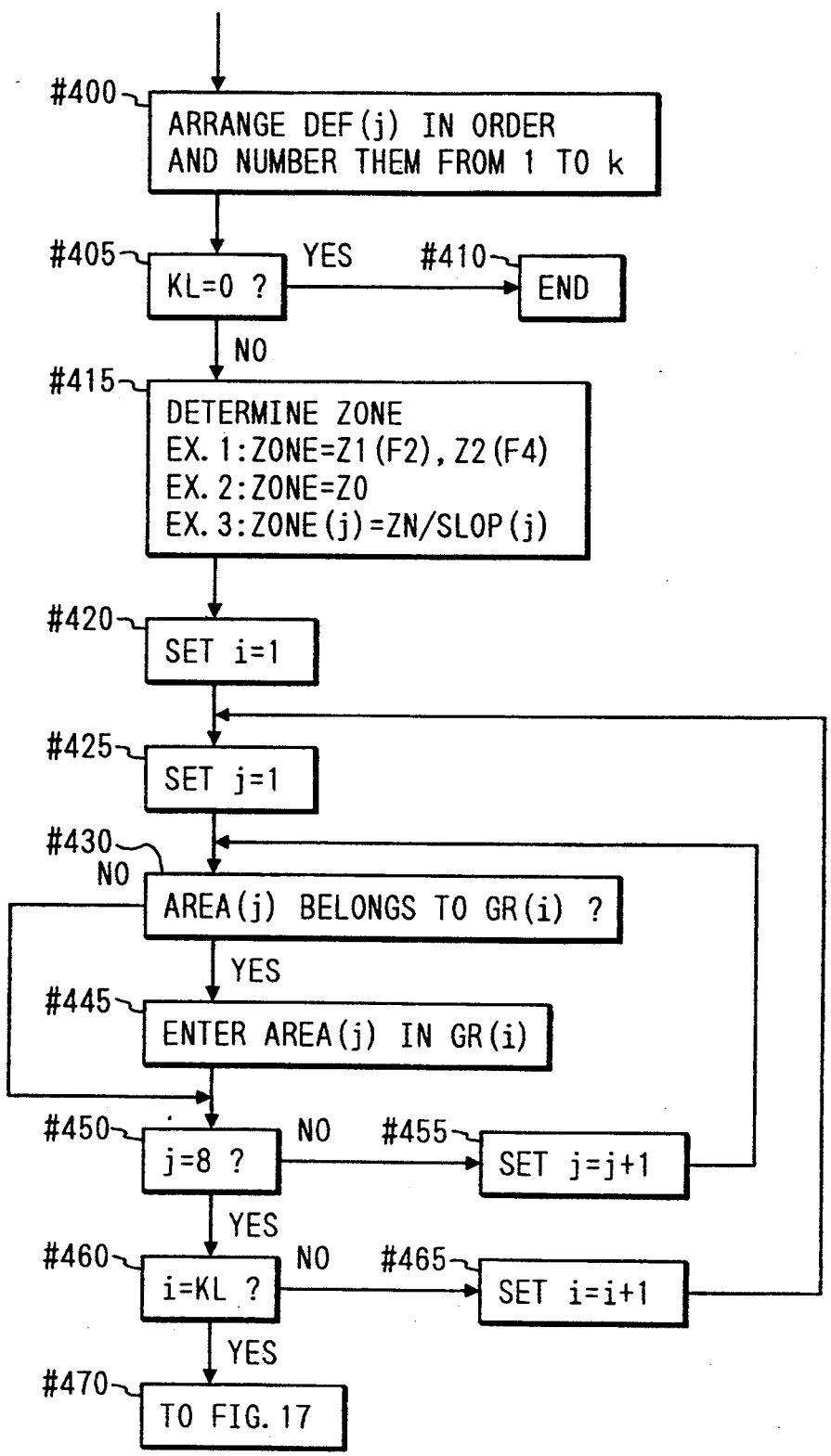

FIG. 13 is a flowchart showing a third embodiment of the grouping process.

The processes from step #400 to step #415 are the same as the processes from step #200 to step #215 of the first embodiment in FIG. 7, so the explanation is omitted.

Figure 17:
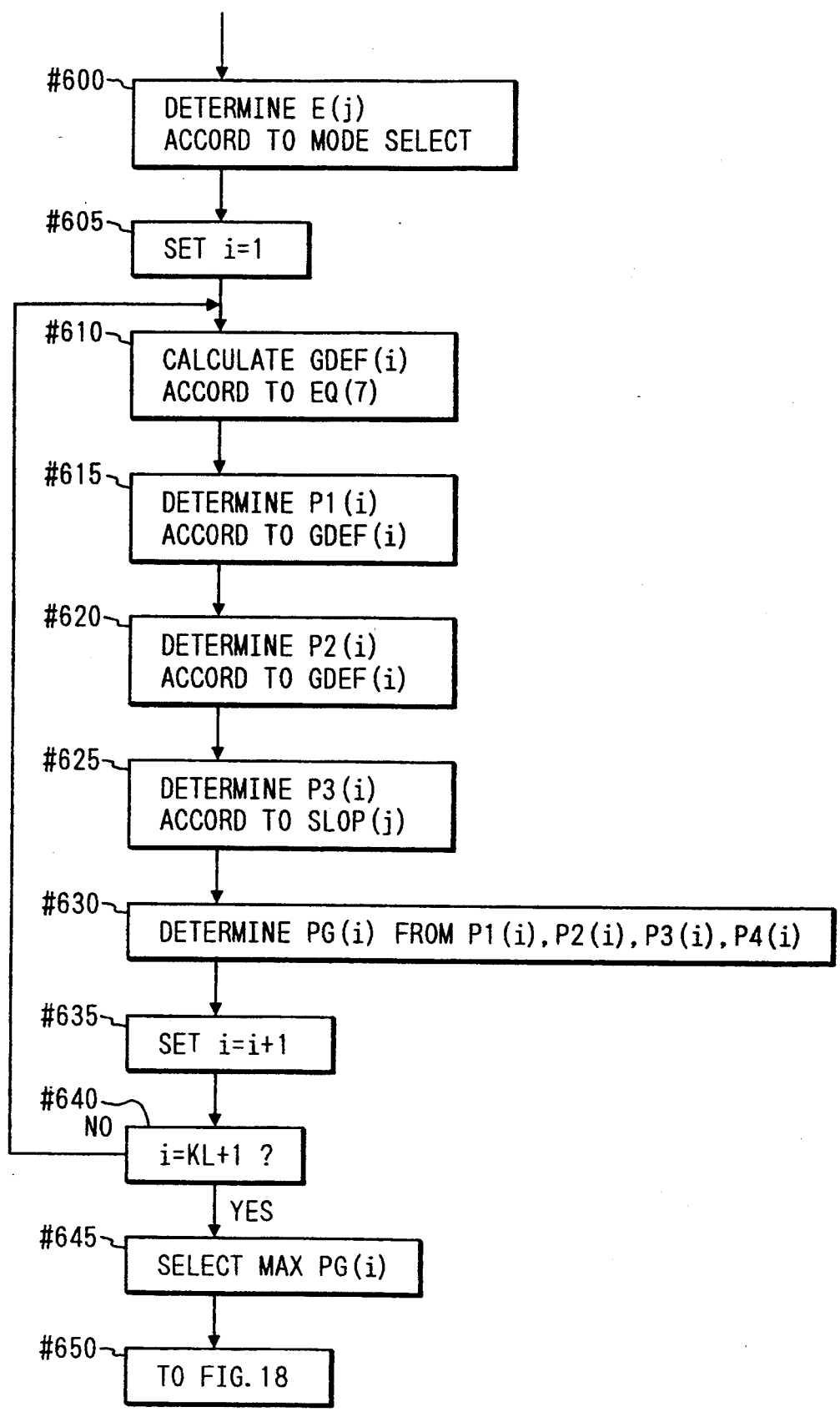
FIG. 17 is a flowchart of an optimum group selection process.

In step #420, for initialization of the grouping process, the group number i is set at 1. In step #425, an area number j is set at 1. In step #430, it is judged whether the defocus amount DEF (j) falls within ±ZONE (example 1 or 2 for zone size), ±ZONE (i) or ±(ZONE (i) +ZONE (j)) (example 3 for zone size) around the defocus amount of the area of number i. In the case of "yes", it is judged that they belong to the same group. In step #445, the area of number j is entered into the group GR (i) and the operation proceeds to step #450. In the case of "no", it is judged that they do not belong to the same group. Grouping registration in step #445 is not performed and the operation proceeds to step #450. In step #450, it is judged whether the area number j has become 8, namely, whether it is an end area. In the case of "no", the area number j is updated in step #455 and the operation returns to step #430 where the group judgment is continued. In the case of "yes", it is judged in step #460 whether the group number i has reached the end number KL, namely, whether it is an end group. In the case of "no", the group number i is updated in step #465 and the operation returns to step #425 where the group judgment is started again. In the case of "yes", the grouping process is terminated and the operation proceeds to step #470 where the group selection process in FIG. 17 is performed.

Figure 14:
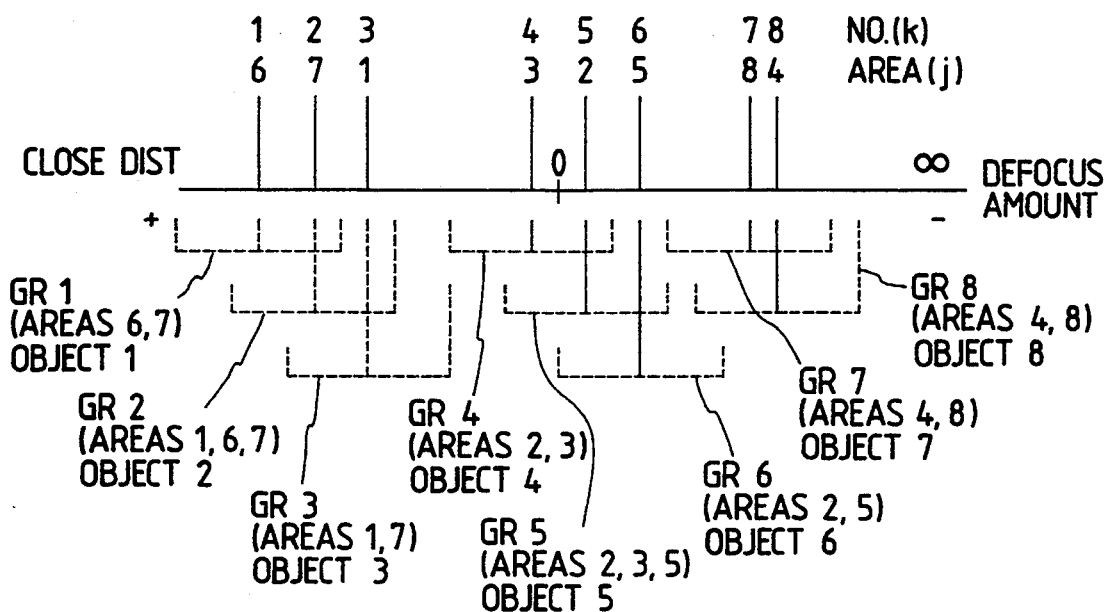

The above process is repeated and when the operation branches to step #470, the areas have been grouped, for example, as in FIG. 14. In the case of the third embodiment of the grouping process, the spread of one group on the defocus axis is determined with the defocus amount of a certain area which is the center as a reference. When a plurality of areas exist in a group, all the areas belonging to the group satisfy such a relationship as that in FIG. 9B or 10B with respect to the center area. In such grouping, the spread of groups is relatively narrowly limited with the defocus amount of the area which is a reference as the center and the grouping of objects which is more fine and accurate is achieved.

Figure 15:
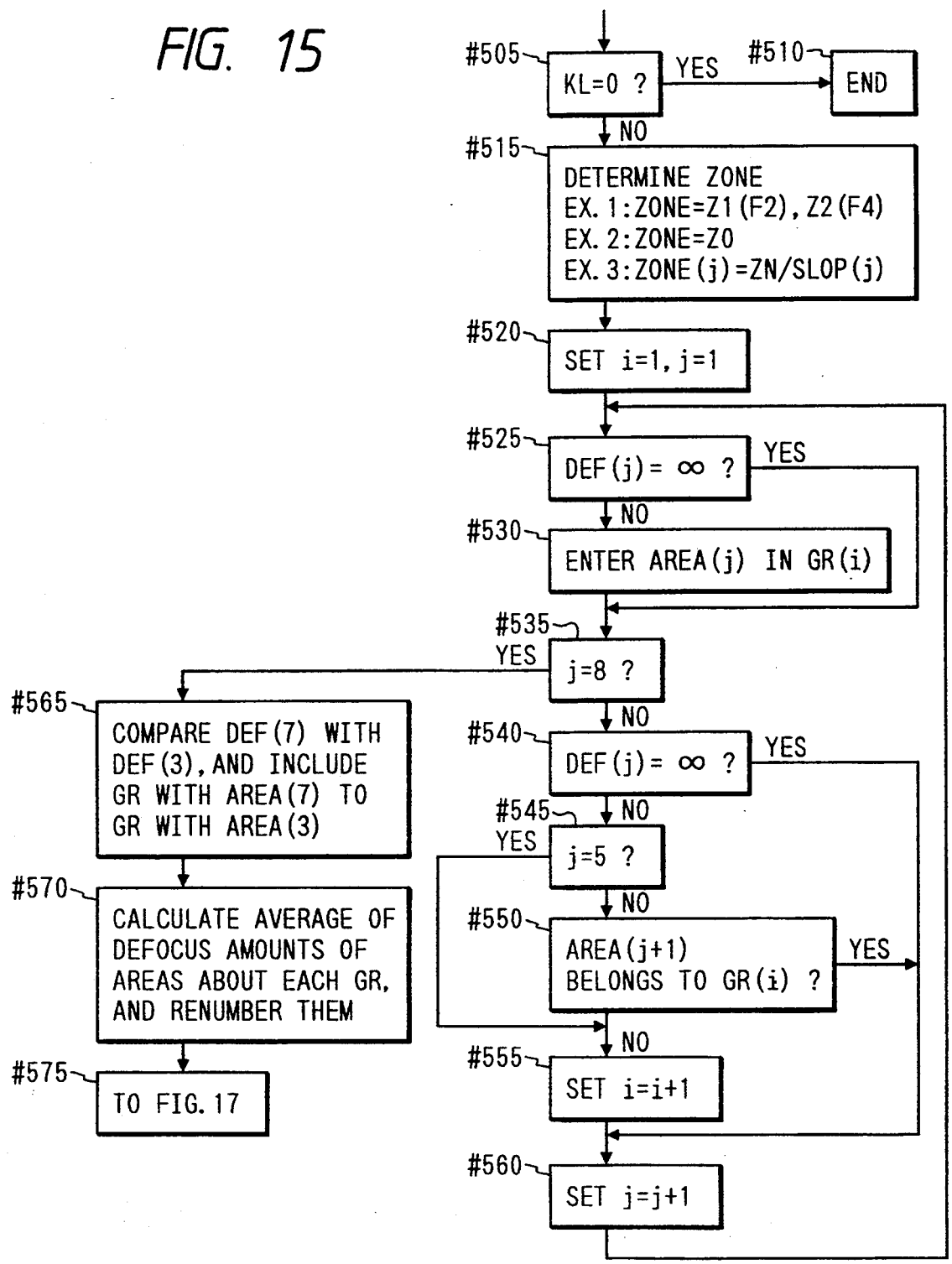

FIG. 15 is a flowchart showing a fourth embodiment of the grouping process.

The processes from step #505 to step #515 are the same as the processes from step #205 to step #215 of the first embodiment in FIG. 7, so the explanation is omitted.

In step #520, for initialization of the grouping process, the group number i and the area number j are both set at 1. In step #525, it is judged whether the defocus amount DEF (j) of the area j is ∞, namely, whether focus detection of the area j cannot be made. In the case of "no", the area j is entered into the group (i) in step #530 and the operation proceeds to step #535. In the case of "yes", the group registration of step #530 is not performed and the operation proceeds to step #535.

In step #535, it is judged whether the area j is 8, namely, whether it is an end area. In the case of "yes", the operation branches to the process of step #565 and those that follow. In the case of "no", the operation proceeds to step #540. In step #540, it is judged whether the defocus amount DEF (j) of the area j is ∞, namely whether focus detection of the area j cannot be made. In the case of "no", the operation proceeds to step #545. In the case of "yes", the group judgment of step #545 and those that follow is not performed and the operation proceeds to step #560.

In step #545, it is judged whether the area j is 5, namely, whether the area is the end area of the horizontal row. In the case of "yes", since it is the end area, the group judgment of step #550 is not performed and the operation proceeds to step #555 where the group is updated. In the case of "no", in step #550 it is judged whether the defocus amount DEF (j+1) of the adjacent area j+1 falls within ±ZONE, ±ZONE (j) or ±(ZONE (j)+ZONE (j+1)) with the defocus amount DEF (j) of the area j as the center. In the case of "yes", it is judged that they belong to the same group. The group update of step #555 is not performed and the operation proceeds to step #560. In the case of "no", it is judged that they do not belong to the same group. The group number i is updated in step #555 and the operation proceeds to step #560.

In step #560, the area number j is updated and the operation returns to step #525 where group judgment is started again.

The above process is repeated and when the operation branches to step #565, it is judged whether the defocus amount DEF (7) which is the center area of the vertical row falls within ±ZONE, ±ZONE (3) or ±(ZONE (3)+ZONE (7)) with the defocus amount DEF (j) of the area 3 which is the center area of the horizontal row as the center. In the case of "yes", the group to which the area 7 belongs is absorbed into the group to which the area 3 belongs.

In step #570, the average value of the defocus amounts of the areas constituting the group is calculated. The group number is renumbered in a closest order according to the value and the operation proceeds to the group selection of step #575.

Figure 16:
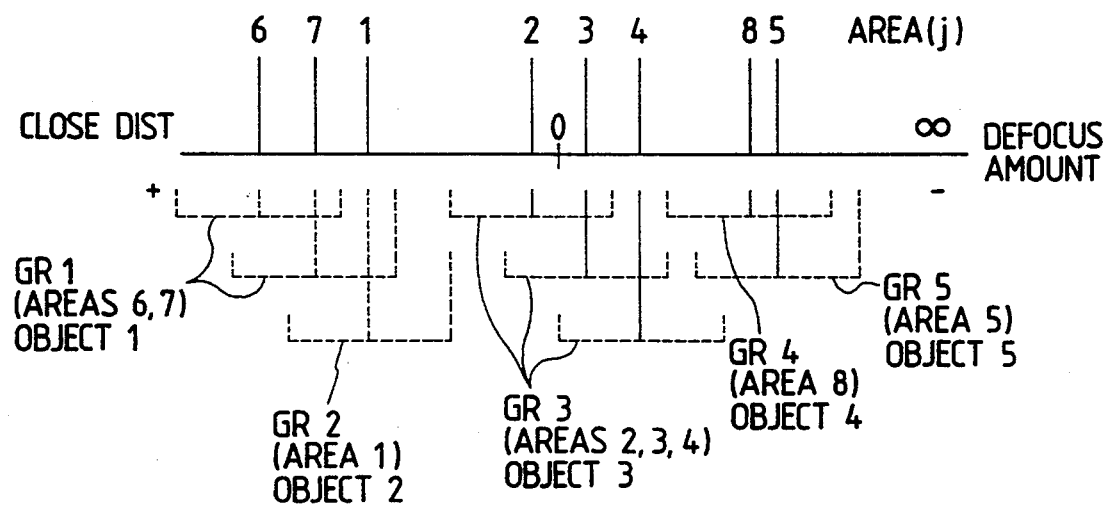

The above process is performed as described above and when the operation branches to step #575, a grouping process for areas has been performed, for example, as shown in FIG. 16. In the case of the fourth embodiment of the grouping process, the spread of one group on the defocus axis is flexible. When a plurality of areas exist in a group, all the areas belonging to the group are always in such a relationship as that in FIG. 9B or 10B with at least one of the areas adjacent to the area. In such grouping, the same groups always form a continuous area on an image plane. When objects are the same, the probability that they are captured in a continuous focus detection area is high, thus the correspondence between a group and an object is improved and the identifiability of an object is increased.

Optimum Group Selection Process

In the optimum group selection process, one group with a high probability that an object in which a photographer has an interest is captured is selected from among a plurality of groups made by a grouping process.

FIG. 17 is a flowchart of the optimum group selection process.

In step #600, the area point E (j) of each focus detection area is determined the basis of the information obtained from a mode selection device 80 as in table 1.

In the case of the center weighted mode, 1 is provided to only the area close to the center among the entire focus detection areas as an area point unless a focus detection cannot be made and the area point of the other areas is set at 0 so that the result of the focus detection is not be affected. The priority of the area in that instance is set as the following order of (area 3, 7)→(area 2, 4, 6, 8)→(area 1, 5).

In table 1, an area point is set so that a detection area moves to the end area in turn when the center area cannot be detected. However, the area point may be set so that detection is performed only in the center area or the shift of a detection area is stopped on the way.

In the other detection modes (closest priority, reliability priority and focusing priority), an area point 0.5 is provided to the end area of the horizontal and vertical row (areas 1, 5, 6 and 8) and an area point 1 is provided to the central area (areas 2, 3, 4 and 7). The chance of an object going in and out in the end area is high due to camera shake or the like. This possibly causes the results of a focus detection to fluctuate. Therefore, the area point of the end area is set lower than that of the central area.

In step #605, the group number i is initialized to 1. In step #610, a group defocus amount GDEF (i) is calculated for each group from the defocus amount of the area belonging to the group in the following manner. For example, suppose that areas 2, 3 and 4 belong to group 1 and the group defocus amount is respectively denoted by DEF (2), DEF (3) and DEF (4), then the group defocus amount GDEF (1) is as in equation (7):

$$
\begin{aligned}
GDEF(1) &= (DEF(2) + DEF(3) + DEF(4))/3, \text{ or} \\
GDEF(1) &= (DEF(2) * E(2) + DEF(3) * E(3) + \\
& \quad DEF(4) * E(4))/(E(2) + E(3) + E(4))
\end{aligned}
\quad (7)
$$

That is, the group defocus amount is determined as the arithmetic average of the defocus amounts of the areas belonging to the group or as a weighted average with fan area point as a weight. When the sum of the area points is 0 at the time of finding a weighted average, the group defocus amount DEF (j) is regarded as impossible to detect.

In step #615, the closest priority point P1 (i) is determined for each group on the basis of the group defocus amount of the group. In the case where the focal point detection mode is the closest priority mode, as shown in table 1, the closest priority point 1 is given to the group whose group defocus amount is a maximum or closest, and a point α(0<α<1) or 0 is given to other groups. The higher the closest priority is, the smaller the value of α is set. A predetermined value α is given to the other groups in table 2-1. However, the degree of closest may be calculated according to the order of the defocus amount and the deviation from the closest group and a different closest priority point P1 may be given to each group.

In the other detection modes (center weighted, reliability priority, and focusing priority), as shown in table 2-2, a closest priority point 0 or 1 is given to a group according to the possible/impossible detection of the group defocus amount. Therefore, if the detection of the group defocus amount is possible, a point is given uniformly. It follows that each group is fairly treated regardless of the value of the group defocus amount.

The setting of the closest priority point P1 as mentioned above gives the closest group a priority in the closest priority mode, and in the other modes, the closest group will not be given a priority.

In step #620, a focusing priority point P2 is determined for each group on the basis of the group defocus amount of the group. When the focal point detection mode is a focal point priority mode, for example, as shown in table 3-1, a focusing priority point 1 is given to the group in which the group defocus amount is at a minimum, namely, closest to a best-focus state and a point $\beta$ ($0<\beta<1$) or 0 is given to the other groups. The higher the focusing priority is, the smaller the value of $\beta$ is set. A predetermined value $\beta$ is given to the other groups in table 3-1. However, the degree of closeness to a best-focus state may be calculated according to the magnitude of the absolute value or the order of the defocus amounts and a different focusing priority point may be given to each group.

In the other detection modes (center weighted, reliability priority, and closest priority), as shown in table 3-2, a focusing priority point 0, $\gamma$ or 1 is given to a group according to the absolute value of the group defocus amount in the same manner as in the above-mentioned table 3-1. $\gamma$ is set at $\beta<\gamma<1$. By giving a certain degree of priority to a group close to a best-focus state, in the modes except the focusing priority mode, stability in the vicinity of a focal point can be increased.

As mentioned above, by setting a focusing priority point P2, a group closest to a best-focus state is given priority in the focusing priority mode and stability is improved in the other groups.

In step #625, a reliability point P3 is determined for each group on the basis of the reliability SLOP (j) of the defocus amount of the area j belonging to the group. When the focus detection mode is the reliability priority mode, for example, as shown in table 4-1, a reliability priority point 1 is provided to the group which has the greatest sum of reliabilities and a point ($0<$point$<1$) is provided to the other groups according to an amount in which the sum of the reliabilities of the group is divided by the maximum value of the sum of the reliabilities.

In the other detection modes (center weighted, closest priority, and focusing priority), a reliability point 0 or 1 is provided to a group only depending on whether the detection of the group defocus amount is possible or impossible, as shown in table 4-2. If the detection of a group defocus amount is possible, a point is provided uniformly. Therefore, each group is treated fairly regardless of the size of the sum of the reliabilities of the areas belonging to the group.

Furthermore, in the other detection modes, a reliability point shown in table 4-3 may be provided. In this case, if the sum of the reliability of the group is above a predetermined value $\delta$, a reliability point 1 is provided uniformly and if it is below $\delta$, a reliability point is provided according to an amount in which the sum of the reliability is divided by $\delta$. Groups having some degree of reliability are treated fairly even in the modes other than the reliability priority mode in this way and groups having a low reliability are treated by weighting according to the reliability, with the result that the influence of variations due to the uncertainty of the defocus amount can be decreased.

As mentioned above, by setting a reliability point P3, the group having the highest reliability is given priority in the reliability priority mode and stability is improved in the other modes.

In step #630, the total point PG of each group is calculated as the product or sum of a closest priority point P1, a focusing priority point P2 and a reliability point P3. In step #635, the group number i is updated. In step #640, it is judged whether the group number i has become KL+1, namely, whether the group number is at the end. In the case of "no", the operation returns to step #610 where the process of finding the total point of the next group is performed following the last process. The above process is repeated and when the process for the group is finished, the operation proceeds to step #645 where the group having the greatest total PG (i) is selected as an optimum group and proceeds to the optimum defocus amount calculation of step #650 in FIG. 19.

In the above-mentioned optimum group selection process, a point according to a plurality of selection rules (center weighted, closest priority, focusing priority, and reliability priority) is set. A point with respect to a plurality of selection rules is determined in each group and finally a group having the greatest total point is selected. Therefore, this process has the following advantages.

(a) The strength of the effect of the selection rule (degree of priority) can be controlled easily without modifications of a program or the like by changing the point value properly in the same rule.

(b) The strength between selection rules (degree of priority) can be controlled by changing properly the balance of point values among different rules. Therefore, it is not necessary to provide a program for selection separately in each focus detection mode. This system can be used even when a focus detection mode is changed only by changing a point value.

(c) Since a point is set for each selection rule and the selection of an optimum group is made by the product or sum of those points, different rules can easily be used in combination. Also, a new rule can be added easily. For example, when the spread of an area is added to the selection rules, an area point P4 is set and a point value corresponding to the number of the areas belonging to a group should be given. In the case of a specific pattern, e.g., a so-called drop-out pattern, to prevent the drop-out, a drop-out point P5 is set and drop-out judgment (judges whether the end areas 1 and 5 of a horizontal row belong to the closest group) is performed. In the case of a drop-out pattern, only the drop-out point of the closest group is set at 1 and in the case of not a drop-out pattern, the drop-out point of all the groups should be set at 1.

As described above, by introducing an optimum group selection method according to a point system, this system can respond flexibly to the change and addition of modes or optimization of a selection rule.

Figure 18:
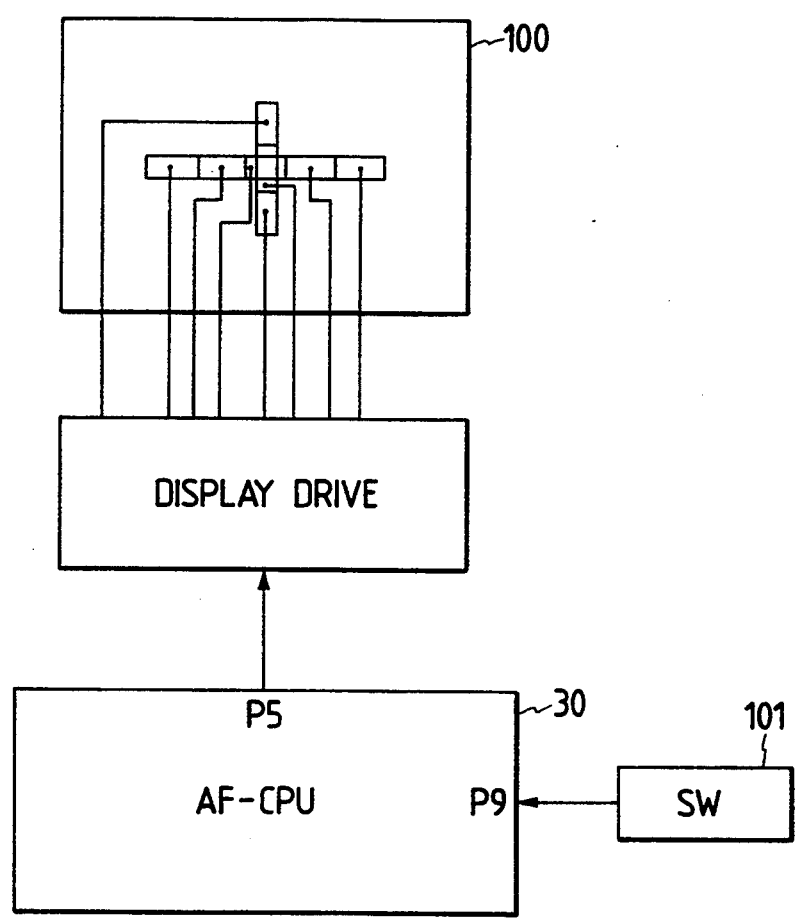
FIG. 18 is a block diagram illustrating a variation of a display device.

In the above explanation, finally one optimum group is selected. However, as shown in FIG. 18, a photographer may confirm the area belonging to the selected group by displaying the area position belonging to the group using the liquid crystal display positioned within the finder vision field 100. In this case, it may be arranged in such a way that a changeover switch 101 connected to the port P9 of the AF-CPU is provided and if the object is which an photographer has an interest is not within the area displayed, the selected group is cancelled by the photographer operating the switch 101, and a group which has the next largest total point is selected in turn.

In the above explanation, the method of allocating numerous kinds of points is changed according to a selected focus detection mode. However, a photographer may directly set a point, or a point may be set by means of ROM data in which a point has previously been set and ROMs are arranged to be capable of being changed with respect to the body and a point may be changed by replacing the ROM. A point is not fixed and learning capabilities may be provided such that the characteristics of the finally selected group (position of the area, the group defocus amount, contrast or the like) are fed back so that the point value is changed so as to satisfy the intention of the photographer.

The above is one example of the optimum group selection process. Of course, it is possible to select an optimum group according to a technique other than this process. For example, the absolute distance of each group may be concluded from the defocus amount and the absolute distance of a photograph lens and the optimum distance and a group may also be determined on the basis of the difference between the closest and farthest distance. Also, the focus detection mode can be changed or an optimum group can be selected according to the distance distribution pattern of areas or groups.

Optimum Defocus Amount Calculation Process

In the optimum defocus amount calculation process, an optimum defocus amount as a whole is calculated on the basis of the defocus amount of a focus detection area belonging to an optimum group selected by the optimum group selection process.

FIG. 19 is a flowchart showing the optimum defocus amount calculation process.

In step #900, a weight W (j) with respect to the focus detection area AREA (j) belonging to an optimum group is determined. For example, as shown in table 5, a weight W (j) can be determined according to the focus detection mode. In the reliability priority mode, the weight W (j) of the-focus detection area AREA (j) is defined as the product of the area point E (j) and the reliability SLOP (j) of the defocus amount of the area. In the other modes, when E (j) * SLOP (j) is above a predetermined value V, the weight W (j) is set at 1 and when it is smaller than the predetermined value V, the weight W (j) is set at E (j) * SLOP (j). By setting in this way, weighting according to the reliability is made in the case of the reliability priority mode and in the other modes, an equivalent weighting is made if there is a certain reliability. In step #905, the optimum defocus amount DEFX is calculated as in equation (8) with the defocus amount DEF (j) of a focus detection area belonging to an optimum group as a weighted average which is weighted by the weight W (j).

$$DEFX = \sum_j (W(j) * SLOP(j)) / \sum_j (W(j)) \qquad (8)$$

where, j in equation (8) is the number of the focus detection area belonging to the optimum group. By adopting a weighted addition average, variations of the optimum defocus amount can be reduced and stability is increased.

In step #910, the display configuration of the AF display device 40 is controlled on the basis of the optimum defocus amount as well as the driving amount of Af motor 50 is controlled and the photograph lens 11 is driven to a best-focus position. As a result of this, an object in focus will be formed on the focus detection area belonging to the optimum group on a photograph image plane. At the termination of the process of step #910, the operation proceeds to the next focus detection cycle again.

In the above-mentioned embodiment, the explanation assumes that a plurality of focus detection areas are set in the form of a cross on the image plane as shown in FIG. 4. However, of course, focus detection areas may be set in a form other than this, and a detection may be set in a two-dimensional form. The present invention is not limited to a focus detecting device of the TTL system and can be applied to a focus detecting device of an external light system. In that case, an object distance can be obtained from a plurality of focus detection areas set in an image plane instead of a defocus amount. It follows that the above-mentioned grouping process, the optimum group selection process, and the optimum distance calculation process should be performed on object distances. The above-mentioned optimum group selection process and the optimum defocus amount calculation process will be explained regarding a specific object.

As shown in FIG. 20, among a plurality of focus detection areas set on a photograph image plane, a human enters the focus detection areas 1, 2, 3, 6, 7 and 8 and distant trees or buildings enter the focus detection areas 4 and 5. In such situation, the defocus amount DEF (j) and the reliability SLOP (j) in each focus detection area are determined as shown in table 6-1. The focus detection areas 1, 2, 3, 6, 7 and 8 are grouped into a group GRP (1) and the focus detection areas 4 and 5 are grouped into a group GRP (2).

If the following are set: $\alpha=0.5$ in table 2-1, $\beta=0.8$ in table 3-1, $\gamma=0.5$ in table 3-2 and $V=300$ in table 5, then the group defocus amount, the closest priority point P1, the focusing priority point P2, the reliability priority point P3 and the total point PG with respect to groups 1 and 2 are calculated as shown in table 6-2 in each focus detection mode. In each focus detection mode, group 1 which has the largest total point PG is selected as the optimum group, and finally the optimum defocus amount is determined as shown in table 6-2.

TABLE 1

| | Area Point | | | |
|---|---|---|---|---|
| | Center Weighted Mode | | | |
| | | Detection of Areas 3, 7 Not Possible | | Other Modes |
| Focus Detection Mode Area Point | Detection of Areas 3, 7 Possible | Detection of Areas 2, 4, 6, 8 Possible | Detection of Areas 2, 4, 6, 8, Not Possible | Closest Priority Mode Reliability Priority Mode Focusing Priority Mode |
| E (1) | 0 | 0 | 1 | .5 |
| E (2) | 0 | 1 | 0 | 1 |
| E (3) | 1 | 0 | 0 | 1 |
| E (4) | 0 | 1 | 0 | 1 |
| E (5) | 0 | 0 | 1 | .5 |
| E (6) | 0 | 1 | 0 | .5 |
| E (7) | 1 | 0 | 0 | 1 |

TABLE 1-continued

| | Area Point | | | |
|---|---|---|---|---|
| | Center Weighted Mode | | | Other Modes |
| | | Detection of Areas 3, 7 Not Possible | | |
| Focus Detection Mode Area Point | Detection of Areas 3, 7 Possible | Detection of Areas 2, 4, 6, 8 Possible | Detection of Areas 2, 4, 6, 8, Not Possible | Closest Priority Mode Reliability Priority Mode Focusing Priority Mode |
| E (8) | 0 | 1 | 0 | .5 |

TABLE 2-1

| | Closest Priority Point | | |
|---|---|---|---|
| | Closest Priority Mode | | |
| Focus Detection Mode Closest Priority Mode | Detection of GDEF (i) Not Possible | Detection of GDEF (i) Possible | |
| | | GDEF (i) not at maximum | GDEF (i) at maximum |
| P1 (i) | 0 | α | 1 |

TABLE 2-2

| | Closest Priority Point | |
|---|---|---|
| | Other Modes (Center Weighted, Focusing Priority, Reliability Priority) | |
| Focus Detection Mode Closest Priority Point | Detection of GDEF (i) Not Possible | Detection of GDEF (i) Possible |
| P1 (i) | 0 | 1 |

TABLE 3-1

| | Focusing Priority Point | | |
|---|---|---|---|
| | Focusing Priority Mode | | |
| Focus Detection Mode Focusing Priority Point | Detection of GDEF (i) Not Possible | Detection GDEF (i) Possible | |
| | | \|GDEF (i)\| not at minimum | \|GDEF (i)\| at minimum |
| P2 (i) | 0 | β | 1 |

TABLE 3-2

| | Closest Priority Point | | |
|---|---|---|---|
| | Other Modes (Center Weighted, Focusing Priority, Reliability Priority) | | |
| Focus Detection Mode Focusing Priority Point | Detection of GDEF (i) Not Possible | Detection of GDEF (i) Possible | |
| | | \|GDEF (i)\| not at minimum | \|GDEF (i)\| at minimum |
| P2 (i) | 0 | γ | 1 |

TABLE 4-1

| | Reliability Point | |
|---|---|---|
| | Reliability Priority Mode | |
| Focusing Detection Mode Reliability Point | Detection of GDEF (i) not Possible | Detection of GDEF (i) Possible |
| P3 (i) | 0 | 1 is given to GSMAX GSLOP(i)/GSMAX is given to others. GSLOP(i) = $\sum_{j}(E(i)*SLOP(j))$ where, j are areas belonging to group i and GSMAX is a maximum |

TABLE 4-1-continued

| | Reliability Point | |
|---|---|---|
| | Reliability Priority Mode | |
| Focusing Detection Mode Reliability Point | Detection of GDEF (i) not Possible | Detection of GDEF (i) Possible |
| | | value of GSLOP (i) |

TABLE 4-2

| | Reliability Point | |
|---|---|---|
| | Other Modes (Center Weighted, Closest Priority, Focusing Priority) | |
| Focus Detection Mode Reliability Point | Detection of GDEF (j) Not Possible | Detection of GDEF (j) Possible |
| P3 (i) | 0 | 1 |

TABLE 4-3

| | Reliability Point | |
|---|---|---|
| | Other Modes (Center Weighted, Closest Priority, Focusing Priority) | |
| Focus Detection Mode Reliability Point | Detection of GDEF (j) Not Possible | Detection of GDEF (j) Possible |
| P3 (i) | 0 | $(\sum_{j}(E(j)*SLOP(j)))/\delta$ j are areas belonging to group i. δ is a predetermined value. When δ is 1 or greater, it is cut to 1. |

TABLE 5

| | Weight W (j) | |
|---|---|---|
| Focus Detection Weight Mode | Reliability Priority | Other Modes (Center Weighted, Closest Priority, Focusing Priority) |
| W (j) | E(j)*SLOP(j) | 1 When E(j)*SLOP(j) > V, E(j)*SLOP(j) When E(j)*SLOP(j) ≦ V, |

TABLE 6-1

| DEF (j) and SLOP (j) of Each Area | | | |
|---|---|---|---|
| AREA | DEF (μm) | SLOP | GRP |
| 1 | 280 | 880 | 1 |
| 2 | 300 | 1240 | 1 |
| 3 | 320 | 1180 | 1 |
| 4 | −1680 | 540 | 2 |
| 5 | −1720 | 820 | 2 |
| 6 | 330 | 750 | 1 |
| 7 | 320 | 1200 | 1 |

TABLE 6-1-continued

DEF (j) and SLOP (j) of Each Area

| AREA | DEF (μm) | SLOP | GRP |
|---|---|---|---|
| 8 | 340 | 940 | 1 |

TABLE 6-2

| Focus Detection Mode | | Center Weighted Mode | | Closest Priority Mode | | Focusing Priority Mode | | Reliability Priority Mode | |
|---|---|---|---|---|---|---|---|---|---|
| | | \_\_\_\_ Point of Each Group \_\_\_\_ | | | | | | | |
| Group GRP | | 1 | 2 | 1 | 2 | 1 | 2 | 1 | 2 |
| Group Defocus Amount | | 320 | Not Possible | 314 | −1693 | 314 | −1693 | 314 | −1693 |
| Closest Priority Point | P1 | 1 | 0 | 1 | .5 | 1 | 1 | 1 | 1 |
| Focusing Priority Point | P2 | 1 | 0 | 1 | .8 | 1 | .5 | 1 | .8 |
| Reliability Point | P3 | 1 | 0 | 1 | 1 | 1 | 1 | 1 | .19 |
| Total Point (Product) | PG | 1 | 0 | 1 | .4 | 1 | .5 | 1 | .15 |
| Optimum Group | | 1 | | 1 | | 1 | | 1 | |
| Optimum Defocus Amount | | 320 | | 315 | | 315 | | 314 | |

We claim:

1. A focus detecting device of a camera including an image forming optical system, comprising:

focus detecting means provided with a plurality of focus detection areas for receiving light from an object to be photographed through said image forming optical system and calculating a plurality of defocus amounts with respect to said plurality of focus detection areas, respectively;

classifying means for classifying said plurality of focus detection areas into a plurality of groups, the classifying being performed in such a manner that a difference between two defocus amounts of two areas, which are arbitrarily selected and belong to the same group, is less than a predetermined value;

selecting means for selecting one optimum group from said plurality of groups; and defocus amount determining means for determining one final defocus amount on the basis of the defocus amounts of the detection areas belonging to the selected optimum group.

2. A focus detecting device of a camera including an image forming optical system, comprising:

focus detecting means provided with a plurality of focus detection areas for receiving light from an object to be photographed through said image forming optical system and calculating a plurality of defocus amounts with respect to said plurality of focus detection areas, respectively;

classifying means for classifying said plurality of focus detection areas into a plurality of groups, the classifying being performed in such a manner that a difference between any defocus amount and a next defocus amount which belong to one of said plurality of groups and arranged in order of magnitudes in said one group, is less than a predetermined value;

selecting means for selecting one optimum group from said plurality of groups; and defocus amount determining means for determining one final defocus amount on the basis of the defocus amounts of the detection areas belonging to the selected optimum group.

3. A focus detecting device of a camera including an image forming optical system, comprising:

focus detecting means provided with a plurality of focus detection areas for receiving light from an object to be photographed through said image forming optical system and calculating a plurality of defocus amounts with respect to said plurality of focus detection areas, respectively;

classifying means for classifying said plurality of focus detection areas into a plurality of groups on the basis of said plurality of defocus amounts of said plurality of focus detection areas;

selecting means for selecting one optimum group from said plurality of groups on the basis of positions of said plurality of focus detection areas; and defocus amount determining means for determining one final defocus amount on the basis of the defocus amounts of the detection areas belonging to the selected optimum group.

4. A focus detecting device of a camera including an image forming optical system, comprising:

focus detecting means provided with a plurality of focus detection areas for receiving light from an object to be photographed through said image forming optical system and calculating a plurality of defocus amounts with respect to said plurality of focus detection areas, respectively;

classifying means for classifying said plurality of focus detection areas into a plurality of groups on the basis of said plurality of defocus amounts of said plurality of focus detection areas;

selecting means for selecting one optimum group from said plurality of groups on the basis of contrasts of said plurality of focus detection areas; and defocus amount determining means for determining one final defocus amount on the basis of the defocus amounts of the detection areas belonging to the selected optimum group.

5. A focus detecting device of a camera including an image forming optical system, comprising:

focus detecting means provided with a plurality of focus detection areas for receiving light from an object to be photographed through said image forming optical system and calculating a plurality of defocus amounts with respect to said plurality of focus detection areas, respectively;

classifying means for classifying said plurality of focus detection areas into a plurality of groups on the basis of said plurality of defocus amounts of said plurality of focus detection areas;

selecting means for selecting one optimum group from said plurality of groups on the basis of the defocus amounts corresponding to said plurality of focus detection areas; and defocus amount determining means for determining one final defocus amount on the basis of the defocus amounts of the detection areas belonging to the selected optimum group.

6. A focus detecting device according to claim 5, wherein said selecting means selects the optimum group on the distribution of the defocus amounts.

7. A focus detecting device of a camera including an image forming optical system, comprising:
   focus detecting means provided with a plurality of focus detection areas for receiving light from an object to be photographed through said image forming optical system and calculating a plurality of defocus amounts with respect to said plurality of focus detection areas, respectively;
   classifying means for classifying said plurality of focus detection areas into a plurality of groups on the basis of said plurality of defocus amounts of said plurality of focus detection areas;
   selecting means for selecting one optimum group from said plurality of groups on the basis of reliabilities of said plurality of focus detection areas; and
   defocus amount determining means for determining one final defocus amount on the basis of the defocus amounts of the detection areas belonging to the selected optimum group.

8. A focus detecting device of a camera including an image forming optical system, comprising:
   focus detecting means provided with a plurality of focus detection areas for receiving light from an object to be photographed through said image forming optical system and calculating a plurality of defocus amounts with respect to said plurality of focus detection areas, respectively;
   classifying means for classifying said plurality of focus detection areas into a plurality of groups on the basis of said plurality of defocus amounts of said plurality of focus detection areas;
   selecting means for selecting one optimum group from said plurality of groups on the basis of number of said plurality of focus detection areas; and
   defocus amount determining means for determining one final defocus amount on the basis of the defocus amounts of the detection areas belonging to the selected optimum group.

9. A focus detecting device of a camera including an image forming optical system, comprising:
   focus detecting means provided with a plurality of focus detection areas for receiving light from an object to be photographed through said image forming optical system and calculating a plurality of defocus amounts with respect to said plurality of focus detection areas, respectively;
   classifying means for classifying said plurality of focus detection areas into a plurality of groups on the basis of said plurality of defocus amounts of said plurality of focus detection areas;
   selecting means for selecting one optimum group from said plurality of groups on the basis of the number of said plurality of focus detection areas; and
   defocus amount determining means for determining one final defocus amount on the basis of the defocus amounts of the detection areas belonging to the selected optimum group, said defocus amount determining means calculating a mean value of defocus amounts of the detection areas belonging to said optimum group as said final defocus amount.

10. A focus detecting device according to claim 9, wherein said determining means calculates a weighted mean value of defocus amounts as said final defocus amount by weights corresponding to positions of said plurality of focus detection areas.

11. A focus detecting device of a camera including an image forming optical system, comprising:
   focus detecting means provided with a plurality of focus detection areas for receiving light from an object to be photographed through said image forming optical system and calculating a plurality of defocus amounts with respect to said plurality of focus detection areas, respectively;
   classifying means for classifying said plurality of focus detection areas into a plurality of groups on the basis of said plurality of defocus amounts of said plurality of focus detection areas;
   selecting means for selecting one optimum group from said plurality of groups;
   mode setting means provided with a plurality of modes, each of which has a basis for selecting the optimum group, for setting one of said plurality of modes, said selecting means selecting the optimum group in response to the set mode; and
   defocus amount determining means for determining one final defocus amount on the basis of the defocus amounts of the detection areas belonging to the selected optimum group.

12. A focus detecting device of a camera including an image forming optical system, comprising:
   focus detecting means provided with a plurality of focus detection areas for receiving light from an object to be photographed through said image forming optical system and calculating a plurality of defocus amounts with respect to said plurality of focus detection areas, respectively;
   classifying means for classifying said plurality of focus detection areas into a plurality of groups on the basis of said plurality of defocus amounts of said plurality of focus detection areas,
   selecting means for selecting one optimum group from said plurality of groups on the basis of the number of said plurality of focus detection areas;
   defocus amount determining means for determining one final defocus amount on the basis of the defocus amounts of the focus detection areas belonging to the selected optimum group; and
   display means for displaying a position of the focus detection areas belonging to the selected optimum group.

13. A focus detecting method of a camera having an image forming optical system and a plurality of focus detection areas, comprising:
   calculating a plurality of defocus amounts with respect to said plurality of focus detection areas, respectively;
   classifying said plurality of focus detection areas into a plurality of groups on the basis of said plurality of defocus amounts of said plurality of focus detection areas;
   selecting an optimum group from said plurality of groups; and
   determining one final defocus amount on the basis of the defocus amounts of the detection areas belonging to the selected optimum group.

14. A focus detecting method according to claim 13, wherein said classifying is performed in such a manner that a difference between two defocus amounts of two areas, which are arbitrarily selected and belong to the same group, is less than a predetermined value.

15. A focus detecting method according to claim 13, wherein said classifying is performed in such a manner that a difference between any defocus amount and a next defocus amount which belong to one of said plurality of groups and arranged in order of magnitudes in said one group, is less than a predetermined value.

16. A focus detecting method of a camera having an image forming optical system and a plurality of focus detection areas, comprising:

calculating a plurality of defocus amounts with respect to said plurality of focus detection areas, respectively;

determining one defocus amount of said plurality of defocus amounts which indicates the closest distance of an object;

extracting from said plurality of defocus amounts at least one defocus amount whose difference from said determined defocus amount is within a predetermined amount; and calculating a mean value of extracted defocus amounts when a plurality of defocus amounts are extracted.

17. A focus detecting method of a camera having an image forming optical system and a plurality of focus detection areas, comprising:

calculating a plurality of defocus amounts with respect to said plurality of focus detection areas, respectively;

extracting from said plurality of defocus amounts at least one defocus amount which is within a predetermined range; and calculating a mean value of extracted defocus amounts when a plurality of defocus amounts are extracted.

18. A focus detecting method of a camera having an image forming optical system and a plurality of focus detection areas, comprising:

calculating a plurality of defocus amounts with respect to said plurality of focus detection areas, respectively; and calculating a weighted mean value of said plurality of defocus amounts on the basis of weights corresponding to the positions of said plurality of focus detection areas.

* * * * *